United States Patent
Tyler et al.

(10) Patent No.: US 11,755,049 B2
(45) Date of Patent: Sep. 12, 2023

(54) SYSTEMS AND METHODS FOR STABILIZER CONTROL

(71) Applicant: Dominion Energy, Inc., Richmond, VA (US)

(72) Inventors: Stephen J. Tyler, Henrico County, VA (US); Phillip W. Powell, Chesterfield County, VA (US)

(73) Assignee: Dominion Energy, Inc., Richmond, VA (US)

( * ) Notice: Subject to any disclaimer, the term of this patent is extended or adjusted under 35 U.S.C. 154(b) by 0 days.

(21) Appl. No.: 17/744,400

(22) Filed: May 13, 2022

(65) Prior Publication Data
US 2022/0276668 A1 Sep. 1, 2022

Related U.S. Application Data

(63) Continuation of application No. 16/924,347, filed on Jul. 9, 2020, now Pat. No. 11,353,907, which is a
(Continued)

(51) Int. Cl.
*G05F 1/66* (2006.01)
*G06Q 50/06* (2012.01)
(Continued)

(52) U.S. Cl.
CPC ............. *G05F 1/66* (2013.01); *G05B 19/042* (2013.01); *G05B 19/0428* (2013.01);
(Continued)

(58) Field of Classification Search
USPC .................................................. 700/296, 295
See application file for complete search history.

(56) References Cited

U.S. PATENT DOCUMENTS

| 3,900,842 A | 8/1975 | Calabro et al. |
| 3,970,898 A | 7/1976 | Baumann et al. |

(Continued)

FOREIGN PATENT DOCUMENTS

| CN | 102055201 A | 5/2011 |
| EA | 9685 | 2/2008 |

(Continued)

OTHER PUBLICATIONS

ANSI C84.1-2006; American National Standard For Electric Power Systems and Equipment Voltage Ratings (60 Hertz); National Electrical Manufactures Association, Approved Dec. 6, 2006, American National Standards Institute, Inc., pp. 1-23.
(Continued)

*Primary Examiner* — Emilio J Saavedra
(74) *Attorney, Agent, or Firm* — Blank Rome LLP

(57) ABSTRACT

A method, apparatus, system and computer program is provided for controlling an electric power system, including implementation of a voltage control and conservation (VCC) system used to optimally control the independent voltage and capacitor banks using a linear optimization methodology to minimize the losses in the EEDCS and the EUS. An energy validation process system (EVP) is provided which is used to document the savings of the VCC and an EPP is used to optimize improvements to the EEDCS for continuously improving the energy losses in the EEDS. The EVP system measures the improvement in the EEDS a result of operating the VCC system in the "ON" state determining the level of energy conservation achieved by the VCC system. In addition the VCC system monitors pattern recognition events and compares them to the report-by-exception data to detect HVL events. If one is detected the VCC optimizes the capacity of the EEDS to respond to the HVL events by centering the piecewise linear solution maximizing the abil-
(Continued)

ity of the EDDS to absorb the HVL event. The VCC stabilizer function integrates voltage data from AMI meters and assess the state of the grid and initiates appropriate voltage control actions to hedge against predictable voltage risks.

15 Claims, 15 Drawing Sheets

Related U.S. Application Data continuation of application No. 15/243,217, filed on Aug. 22, 2016, now Pat. No. 10,732,656.

(60) Provisional application No. 62/208,894, filed on Aug. 24, 2015.

(51) Int. Cl.
*G05B 19/042* (2006.01)
*H02J 3/28* (2006.01)
*H02J 3/16* (2006.01)
*H02J 3/38* (2006.01)

(52) U.S. Cl.
CPC ............... *G06Q 50/06* (2013.01); *H02J 3/16* (2013.01); *H02J 3/28* (2013.01); *H02J 3/38* (2013.01); *H02J 3/381* (2013.01); *H02J 3/388* (2020.01); *H02J 2300/24* (2020.01); *H02J 2300/28* (2020.01); *Y02E 10/56* (2013.01); *Y02E 10/76* (2013.01); *Y02E 40/30* (2013.01); *Y02E 40/70* (2013.01); *Y02E 70/30* (2013.01); *Y04S 10/50* (2013.01)

(56) References Cited

U.S. PATENT DOCUMENTS

| | | |
|---|---|---|
| 4,054,830 A | 10/1977 | Harrel |
| 4,234,904 A | 11/1980 | Fahlesson |
| 4,291,377 A | 9/1981 | Schneider et al. |
| 4,302,750 A | 11/1981 | Wadhwani et al. |
| 4,307,380 A | 12/1981 | Gander |
| 4,309,655 A | 1/1982 | Lienhard et al. |
| 4,310,829 A | 1/1982 | Rey |
| 4,356,553 A | 10/1982 | Steinle et al. |
| 4,361,872 A | 11/1982 | Spalti |
| 4,365,302 A | 12/1982 | Elms |
| 4,434,400 A | 2/1984 | Halder et al. |
| 4,513,273 A | 4/1985 | Friedl |
| 4,525,668 A | 6/1985 | Lienhard et al. |
| 4,540,931 A | 9/1985 | Hahn |
| 4,630,220 A | 12/1986 | Peckinpaugh |
| 4,686,630 A | 8/1987 | Marsland et al. |
| 4,689,752 A | 8/1987 | Fernandes et al. |
| 4,695,737 A | 9/1987 | Rabon et al. |
| 4,791,520 A | 12/1988 | Stegmuller |
| 4,843,310 A | 6/1989 | Friedl |
| 4,853,620 A | 8/1989 | Halder et al. |
| 4,881,027 A | 11/1989 | Joder et al. |
| 4,887,028 A | 12/1989 | Voisine et al. |
| 4,894,610 A | 1/1990 | Friedl |
| 4,896,106 A | 1/1990 | Voisine et al. |
| 5,028,862 A | 7/1991 | Roth |
| 5,032,785 A | 7/1991 | Mathis et al. |
| 5,055,766 A | 10/1991 | McDermott et al. |
| 5,066,906 A | 11/1991 | Moore |
| 5,124,624 A | 6/1992 | de Vries et al. |
| 5,128,855 A | 7/1992 | Hilber et al. |
| 5,136,233 A | 8/1992 | Klinkenberg et al. |
| 5,231,347 A | 7/1993 | Voisine et al. |
| 5,249,150 A | 9/1993 | Gruber et al. |
| 5,262,715 A | 11/1993 | King et al. |
| 5,270,639 A | 12/1993 | Moore |
| 5,272,462 A | 12/1993 | Teyssandier et al. |
| 5,298,857 A | 3/1994 | Voisine et al. |
| 5,343,143 A | 8/1994 | Voisine et al. |
| 5,422,561 A | 6/1995 | Williams et al. |
| 5,432,507 A | 7/1995 | Mussino et al. |
| 5,466,973 A | 11/1995 | Griffioen |
| 5,475,867 A | 12/1995 | Blum |
| 5,511,108 A | 4/1996 | Severt et al. |
| 5,552,696 A | 9/1996 | Trainor et al. |
| 5,602,750 A | 2/1997 | Severt et al. |
| 5,604,414 A | 2/1997 | Milligan et al. |
| 5,610,394 A | 3/1997 | Lee |
| 5,627,759 A | 5/1997 | Bearden et al. |
| 5,646,512 A | 7/1997 | Beckwith |
| 5,673,252 A | 9/1997 | Johnson et al. |
| 5,736,848 A | 4/1998 | De Vries et al. |
| 5,903,548 A | 5/1999 | Delamater |
| 5,918,380 A | 7/1999 | Schleich et al. |
| 5,963,146 A | 10/1999 | Johnson et al. |
| 6,006,212 A | 12/1999 | Schleich et al. |
| 6,026,355 A | 2/2000 | Rahman et al. |
| 6,172,616 B1 | 1/2001 | Johnson et al. |
| 6,218,995 B1 | 4/2001 | Higgins et al. |
| 6,219,655 B1 | 4/2001 | Schleich et al. |
| 6,311,105 B1 | 10/2001 | Budike, Jr. |
| 6,333,975 B1 | 12/2001 | Brunn et al. |
| 6,373,236 B1 | 4/2002 | Lemay, Jr. et al. |
| 6,373,399 B1 | 4/2002 | Johnson et al. |
| 6,417,729 B1 | 7/2002 | Lemay et al. |
| 6,555,997 B1 | 4/2003 | De Vries et al. |
| 6,590,376 B1 | 7/2003 | Bammert et al. |
| 6,618,684 B1 | 9/2003 | Beroset et al. |
| 6,628,207 B1 | 9/2003 | Hemminger et al. |
| 6,633,823 B2 | 10/2003 | Bartone et al. |
| 6,636,893 B1 | 10/2003 | Fong |
| 6,650,249 B2 | 11/2003 | Meyer et al. |
| 6,653,945 B2 | 11/2003 | Johnson et al. |
| 6,667,692 B2 | 12/2003 | Griffin |
| 6,684,245 B1 | 1/2004 | Shuey et al. |
| 6,700,902 B1 | 3/2004 | Meyer |
| 6,703,823 B1 | 3/2004 | Hemminger et al. |
| 6,738,693 B2 | 5/2004 | Anderson |
| 6,747,446 B1 | 6/2004 | Voisine et al. |
| 6,747,981 B2 | 6/2004 | Ardalan et al. |
| 6,756,914 B1 | 6/2004 | Fitzgerald et al. |
| 6,757,628 B1 | 6/2004 | Anderson et al. |
| 6,762,598 B1 | 7/2004 | Hemminger et al. |
| 6,773,652 B2 | 8/2004 | Loy et al. |
| 6,778,099 B1 | 8/2004 | Meyer et al. |
| 6,798,353 B2 | 9/2004 | Seal et al. |
| 6,815,942 B2 | 11/2004 | Randall et al. |
| 6,816,538 B2 | 11/2004 | Shuey et al. |
| 6,832,135 B2 | 12/2004 | Ying |
| 6,832,169 B2 | 12/2004 | Wakida et al. |
| 6,838,867 B2 | 1/2005 | Loy |
| 6,847,201 B2 | 1/2005 | De Vries et al. |
| 6,859,186 B2 | 2/2005 | Lizalek et al. |
| 6,859,742 B2 | 2/2005 | Randall et al. |
| 6,867,707 B1 | 3/2005 | Kelley et al. |
| 6,868,293 B1 | 3/2005 | Schurr et al. |
| 6,873,144 B2 | 3/2005 | Slater et al. |
| 6,882,137 B1 | 4/2005 | Voisine |
| 6,885,185 B1 | 4/2005 | Makinson et al. |
| 6,888,876 B1 | 5/2005 | Mason, Jr. et al. |
| 6,892,144 B2 | 5/2005 | Slater et al. |
| 6,900,737 B1 | 5/2005 | Ardalan et al. |
| 6,906,507 B2 | 6/2005 | Briese et al. |
| 6,906,637 B2 | 6/2005 | Martin |
| 6,940,268 B2 | 9/2005 | Hemminger et al. |
| 6,940,711 B2 | 9/2005 | Heuell et al. |
| 6,947,854 B2 | 9/2005 | Swarztrauber et al. |
| 6,954,061 B2 | 10/2005 | Hemminger et al. |
| 6,982,390 B2 | 1/2006 | Heuell et al. |
| 6,988,043 B1 | 1/2006 | Randall |
| 6,989,667 B2 | 1/2006 | Loy |
| 6,995,685 B2 | 2/2006 | Randall |
| 7,005,844 B2 | 2/2006 | De Vries et al. |
| 7,009,379 B2 | 3/2006 | Ramirez |
| 7,020,178 B2 | 3/2006 | Mason, Jr. et al. |

(56) References Cited

U.S. PATENT DOCUMENTS

| | | |
|---|---|---|
| 7,043,381 B2 | 5/2006 | Wakida et al. |
| 7,046,682 B2 | 5/2006 | Carpenter et al. |
| 7,064,679 B2 | 6/2006 | Ehrke et al. |
| 7,069,117 B2 | 6/2006 | Wilson et al. |
| 7,075,288 B2 | 7/2006 | Martin et al. |
| 7,079,962 B2 | 7/2006 | Cornwall et al. |
| 7,084,783 B1 | 8/2006 | Melvin, Jr. et al. |
| 7,089,125 B2 | 8/2006 | Sonderegger |
| 7,091,878 B2 | 8/2006 | Holle et al. |
| 7,109,882 B2 | 9/2006 | Angelis et al. |
| 7,112,949 B2 | 9/2006 | Voisine |
| 7,116,243 B2 | 10/2006 | Schleich et al. |
| 7,119,698 B2 | 10/2006 | Schleich et al. |
| 7,119,713 B2 | 10/2006 | Shuey et al. |
| 7,126,493 B2 | 10/2006 | Junker et al. |
| 7,126,494 B2 | 10/2006 | Ardalan et al. |
| 7,135,850 B2 | 11/2006 | Ramirez |
| 7,142,106 B2 | 11/2006 | Scoggins |
| 7,145,474 B2 | 12/2006 | Shuey et al. |
| 7,149,605 B2 | 12/2006 | Chassin et al. |
| 7,154,938 B2 | 12/2006 | Cumeralto et al. |
| 7,161,455 B2 | 1/2007 | Tate et al. |
| 7,167,804 B2 | 1/2007 | Fridholm et al. |
| 7,168,972 B1 | 1/2007 | Autry et al. |
| 7,170,425 B2 | 1/2007 | Christopher et al. |
| 7,176,807 B2 | 2/2007 | Scoggins et al. |
| 7,180,282 B2 | 2/2007 | Schleifer |
| 7,187,906 B2 | 3/2007 | Mason, Jr. et al. |
| 7,196,673 B2 | 3/2007 | Savage et al. |
| 7,209,049 B2 | 4/2007 | Dusenberry et al. |
| 7,218,998 B1 | 5/2007 | Neale |
| 7,224,158 B2 | 5/2007 | Petr |
| 7,227,350 B2 | 6/2007 | Shuey |
| 7,230,972 B2 | 6/2007 | Cornwall et al. |
| 7,236,498 B1 | 6/2007 | Moos et al. |
| 7,236,908 B2 | 6/2007 | Timko et al. |
| 7,239,125 B2 | 7/2007 | Hemminger et al. |
| 7,239,250 B2 | 7/2007 | Brian et al. |
| 7,245,511 B2 | 7/2007 | Lancaster et al. |
| 7,262,709 B2 | 8/2007 | Borleske et al. |
| 7,274,187 B2 | 9/2007 | Loy |
| 7,277,027 B2 | 10/2007 | Ehrke et al. |
| 7,283,062 B2 | 10/2007 | Hoiness et al. |
| 7,283,580 B2 | 10/2007 | Cumeralto et al. |
| 7,283,916 B2 | 10/2007 | Cahill-O'Brien et al. |
| 7,298,134 B2 | 11/2007 | Weikel et al. |
| 7,298,135 B2 | 11/2007 | Briese et al. |
| 7,301,476 B2 | 11/2007 | Shuey et al. |
| 7,308,369 B2 | 12/2007 | Rudran et al. |
| 7,308,370 B2 | 12/2007 | Mason, Jr. et al. |
| 7,312,721 B2 | 12/2007 | Mason, Jr. et al. |
| 7,315,162 B2 | 1/2008 | Shuey |
| 7,317,404 B2 | 1/2008 | Cumeralto et al. |
| 7,327,998 B2 | 2/2008 | Kumar et al. |
| 7,336,200 B2 | 2/2008 | Osterloh et al. |
| 7,339,805 B2 | 3/2008 | Hemminger et al. |
| 7,346,030 B2 | 3/2008 | Cornwall |
| 7,348,769 B2 | 3/2008 | Ramirez |
| 7,355,867 B2 | 4/2008 | Shuey |
| 7,362,232 B2 | 4/2008 | Holle et al. |
| 7,362,236 B2 | 4/2008 | Hoiness |
| 7,365,687 B2 | 4/2008 | Borleske et al. |
| 7,417,420 B2 | 8/2008 | Shuey |
| 7,417,557 B2 | 8/2008 | Osterloh et al. |
| 7,421,205 B2 | 9/2008 | Ramirez |
| 7,427,927 B2 | 9/2008 | Borleske et al. |
| 7,453,373 B2 | 11/2008 | Cumeralto et al. |
| 7,471,516 B2 | 12/2008 | Voisine |
| 7,479,895 B2 | 1/2009 | Osterloh et al. |
| 7,486,056 B2 | 2/2009 | Shuey |
| 7,495,578 B2 | 2/2009 | Borleske |
| 7,504,821 B2 | 3/2009 | Shuey |
| 7,505,453 B2 | 3/2009 | Carpenter et al. |
| 7,510,422 B2 | 3/2009 | Showcatally et al. |
| 7,516,026 B2 | 4/2009 | Cornwall et al. |
| 7,535,378 B2 | 5/2009 | Cornwall |
| 7,540,766 B2 | 6/2009 | Makinson et al. |
| 7,545,135 B2 | 6/2009 | Holle et al. |
| 7,545,285 B2 | 6/2009 | Shuey et al. |
| 7,561,062 B2 | 7/2009 | Schleich et al. |
| 7,561,399 B2 | 7/2009 | Slater et al. |
| 7,583,203 B2 | 9/2009 | Uy et al. |
| 7,584,066 B2 | 9/2009 | Roytelman |
| 7,616,420 B2 | 11/2009 | Slater et al. |
| 7,626,489 B2 | 12/2009 | Berkman et al. |
| 7,630,863 B2 | 12/2009 | Zweigle et al. |
| 7,639,000 B2 | 12/2009 | Briese et al. |
| 7,656,649 B2 | 2/2010 | Loy et al. |
| 7,660,672 B2 | 2/2010 | Tan et al. |
| 7,671,814 B2 | 3/2010 | Savage et al. |
| 7,683,642 B2 | 3/2010 | Martin et al. |
| 7,688,060 B2 | 3/2010 | Briese et al. |
| 7,688,061 B2 | 3/2010 | Briese et al. |
| 7,696,941 B2 | 4/2010 | Cunningham, Jr. |
| 7,701,199 B2 | 4/2010 | Makinson et al. |
| 7,702,594 B2 | 4/2010 | Scoggins et al. |
| 7,729,810 B2 | 6/2010 | Bell et al. |
| 7,729,852 B2 | 6/2010 | Hoiness et al. |
| 7,742,430 B2 | 6/2010 | Scoggins et al. |
| 7,746,054 B2 | 6/2010 | Shuey |
| 7,747,400 B2 | 6/2010 | Voisine |
| 7,747,534 B2 | 6/2010 | Villicana et al. |
| 7,756,030 B2 | 7/2010 | Clave et al. |
| 7,756,078 B2 | 7/2010 | Wyk et al. |
| 7,756,651 B2 | 7/2010 | Holdsclaw |
| 7,761,249 B2 | 7/2010 | Ramirez |
| 7,764,714 B2 | 7/2010 | Monier et al. |
| 8,301,314 B2 | 10/2012 | Deaver, Sr. et al. |
| 8,437,883 B2 | 5/2013 | Powell et al. |
| 8,577,510 B2 | 11/2013 | Powell et al. |
| 8,583,520 B1 | 11/2013 | Forbes, Jr. |
| 2002/0072868 A1 | 6/2002 | Bartone et al. |
| 2002/0109607 A1 | 8/2002 | Cumeralto et al. |
| 2002/0128748 A1 | 9/2002 | Krakovich et al. |
| 2002/0158774 A1 | 10/2002 | Johnson et al. |
| 2003/0001754 A1 | 1/2003 | Johnson et al. |
| 2003/0122686 A1 | 7/2003 | Ehrke et al. |
| 2003/0187550 A1 | 10/2003 | Wilson et al. |
| 2004/0061625 A1 | 4/2004 | Ehrke et al. |
| 2004/0066310 A1 | 4/2004 | Ehrke et al. |
| 2004/0070517 A1 | 4/2004 | Ehrke et al. |
| 2004/0119458 A1 | 6/2004 | Heuell et al. |
| 2004/0150575 A1 | 8/2004 | Lizalek et al. |
| 2004/0192415 A1 | 9/2004 | Luglio et al. |
| 2004/0218616 A1 | 11/2004 | Ardalan et al. |
| 2004/0222783 A1 | 11/2004 | Loy |
| 2005/0024235 A1 | 2/2005 | Shuey et al. |
| 2005/0090995 A1 | 4/2005 | Sonderegger |
| 2005/0110480 A1 | 5/2005 | Martin et al. |
| 2005/0119841 A1 | 6/2005 | Martin |
| 2005/0119930 A1 | 6/2005 | Simon |
| 2005/0125104 A1 | 6/2005 | Wilson et al. |
| 2005/0212689 A1 | 9/2005 | Randall |
| 2005/0218873 A1 | 10/2005 | Shuey et al. |
| 2005/0237047 A1 | 10/2005 | Voisine |
| 2005/0240314 A1 | 10/2005 | Martinez |
| 2005/0251401 A1 | 11/2005 | Shuey |
| 2005/0251403 A1 | 11/2005 | Shuey |
| 2005/0270015 A1 | 12/2005 | Hemminger et al. |
| 2005/0278440 A1 | 12/2005 | Scoggins |
| 2006/0001415 A1 | 1/2006 | Fridholm et al. |
| 2006/0012935 A1 | 1/2006 | Murphy |
| 2006/0038548 A1 | 2/2006 | Shuey |
| 2006/0043961 A1 | 3/2006 | Loy |
| 2006/0044851 A1 | 3/2006 | Lancaster et al. |
| 2006/0055610 A1 | 3/2006 | Borisov et al. |
| 2006/0056493 A1 | 3/2006 | Cornwall et al. |
| 2006/0071810 A1 | 4/2006 | Scoggins et al. |
| 2006/0071812 A1 | 4/2006 | Mason et al. |
| 2006/0074556 A1 | 4/2006 | Hoiness et al. |
| 2006/0074601 A1 | 4/2006 | Hoiness et al. |
| 2006/0085147 A1 | 4/2006 | Cornwall et al. |
| 2006/0114121 A1 | 6/2006 | Cumeralto et al. |
| 2006/0126255 A1 | 6/2006 | Slater et al. |

(56) References Cited

U.S. PATENT DOCUMENTS

| | | |
|---|---|---|
| 2006/0145685 A1 | 7/2006 | Ramirez |
| 2006/0145890 A1 | 7/2006 | Junker et al. |
| 2006/0158177 A1 | 7/2006 | Ramirez |
| 2006/0158348 A1 | 7/2006 | Ramirez |
| 2006/0168804 A1 | 8/2006 | Loy et al. |
| 2006/0195229 A1 | 8/2006 | Bell et al. |
| 2006/0202858 A1 | 9/2006 | Holle et al. |
| 2006/0206433 A1 | 9/2006 | Scoggins |
| 2006/0217936 A1 | 9/2006 | Mason et al. |
| 2006/0224335 A1 | 10/2006 | Borleske et al. |
| 2006/0232433 A1 | 10/2006 | Holle et al. |
| 2006/0261973 A1 | 11/2006 | Junker et al. |
| 2007/0013549 A1 | 1/2007 | Schleich et al. |
| 2007/0063868 A1 | 3/2007 | Borleske |
| 2007/0091548 A1 | 4/2007 | Voisine |
| 2007/0096769 A1 | 5/2007 | Shuey |
| 2007/0115022 A1 | 5/2007 | Hemminger et al. |
| 2007/0124109 A1 | 5/2007 | Timko et al. |
| 2007/0124262 A1 | 5/2007 | Uy et al. |
| 2007/0147268 A1 | 6/2007 | Kelley et al. |
| 2007/0177319 A1 | 8/2007 | Hirst |
| 2007/0200729 A1 | 8/2007 | Borleske et al. |
| 2007/0205915 A1 | 9/2007 | Shuey et al. |
| 2007/0213880 A1 | 9/2007 | Ehlers |
| 2007/0222421 A1 | 9/2007 | Labuschagne |
| 2007/0229305 A1 | 10/2007 | Bonicatto et al. |
| 2007/0236362 A1 | 10/2007 | Brian et al. |
| 2007/0257813 A1 | 11/2007 | Vaswani et al. |
| 2007/0262768 A1 | 11/2007 | Holdsclaw |
| 2007/0271006 A1 | 11/2007 | Golden et al. |
| 2008/0001779 A1 | 1/2008 | Cahill-O'Brien et al. |
| 2008/0007247 A1 | 1/2008 | Gervais et al. |
| 2008/0007426 A1 | 1/2008 | Morand |
| 2008/0010212 A1 | 1/2008 | Moore et al. |
| 2008/0012550 A1 | 1/2008 | Shuey |
| 2008/0018492 A1 | 1/2008 | Ehrke et al. |
| 2008/0024115 A1 | 1/2008 | Makinson et al. |
| 2008/0039989 A1 | 2/2008 | Pollack et al. |
| 2008/0062055 A1 | 3/2008 | Cunningham |
| 2008/0068004 A1 | 3/2008 | Briese et al. |
| 2008/0068005 A1 | 3/2008 | Briese et al. |
| 2008/0068006 A1 | 3/2008 | Briese et al. |
| 2008/0079741 A1 | 4/2008 | Martin et al. |
| 2008/0088475 A1 | 4/2008 | Martin |
| 2008/0097707 A1 | 4/2008 | Voisine |
| 2008/0111526 A1 | 5/2008 | Shuey |
| 2008/0116906 A1 | 5/2008 | Martin et al. |
| 2008/0129420 A1 | 6/2008 | Borisov et al. |
| 2008/0129537 A1 | 6/2008 | Osterloh et al. |
| 2008/0143491 A1 | 6/2008 | Deaver |
| 2008/0144548 A1 | 6/2008 | Shuey et al. |
| 2008/0180274 A1 | 7/2008 | Cumeralto et al. |
| 2008/0204272 A1 | 8/2008 | Ehrke et al. |
| 2008/0204953 A1 | 8/2008 | Shuey |
| 2008/0218164 A1 | 9/2008 | Sanderford |
| 2008/0219210 A1 | 9/2008 | Shuey et al. |
| 2008/0224891 A1 | 9/2008 | Ehrke et al. |
| 2008/0238714 A1 | 10/2008 | Ehrke et al. |
| 2008/0238716 A1 | 10/2008 | Ehrke et al. |
| 2008/0266133 A1 | 10/2008 | Martin |
| 2009/0003214 A1 | 1/2009 | Vaswani et al. |
| 2009/0003232 A1 | 1/2009 | Vaswani et al. |
| 2009/0003243 A1 | 1/2009 | Vaswani et al. |
| 2009/0003356 A1 | 1/2009 | Vaswani et al. |
| 2009/0015234 A1 | 1/2009 | Voisine et al. |
| 2009/0062970 A1 | 3/2009 | Forbes, Jr. et al. |
| 2009/0096211 A1 | 4/2009 | Stiesdal |
| 2009/0134996 A1 | 5/2009 | White, II et al. |
| 2009/0146839 A1 | 6/2009 | Reddy et al. |
| 2009/0153356 A1 | 6/2009 | Holt |
| 2009/0167558 A1 | 7/2009 | Borleske et al. |
| 2009/0187284 A1 | 7/2009 | Kreiss et al. |
| 2009/0224940 A1 | 9/2009 | Cornwall |
| 2009/0245270 A1 | 10/2009 | van Greunen et al. |
| 2009/0256364 A1 | 10/2009 | Gadau et al. |
| 2009/0262642 A1 | 10/2009 | van Greunen et al. |
| 2009/0265042 A1 | 10/2009 | Mollenkopf et al. |
| 2009/0276170 A1 | 11/2009 | Bickel |
| 2009/0278708 A1 | 11/2009 | Kelley et al. |
| 2009/0281673 A1 | 11/2009 | Taft |
| 2009/0281679 A1 | 11/2009 | Taft et al. |
| 2009/0284251 A1 | 11/2009 | Makinson et al. |
| 2009/0287428 A1 | 11/2009 | Holdsclaw et al. |
| 2009/0294260 A1 | 12/2009 | Makinson et al. |
| 2009/0295371 A1 | 12/2009 | Pontin et al. |
| 2009/0296431 A1 | 12/2009 | Borisov |
| 2009/0299660 A1 | 12/2009 | Winter |
| 2009/0299884 A1 | 12/2009 | Chandra |
| 2009/0300191 A1 | 12/2009 | Pace et al. |
| 2009/0309749 A1 | 12/2009 | Gilbert et al. |
| 2009/0309756 A1 | 12/2009 | Mason, Jr. et al. |
| 2009/0310511 A1 | 12/2009 | Vaswani et al. |
| 2009/0312881 A1 | 12/2009 | Venturini Cheim et al. |
| 2009/0319093 A1 | 12/2009 | Joos et al. |
| 2010/0007521 A1 | 1/2010 | Cornwall |
| 2010/0007522 A1 | 1/2010 | Morris |
| 2010/0010700 A1 | 1/2010 | Hoiness et al. |
| 2010/0013632 A1 | 1/2010 | Salewske et al. |
| 2010/0026517 A1 | 2/2010 | Cumeralto et al. |
| 2010/0036624 A1 | 2/2010 | Martin et al. |
| 2010/0036625 A1 | 2/2010 | Martin et al. |
| 2010/0040042 A1 | 2/2010 | van Greunen et al. |
| 2010/0045479 A1 | 2/2010 | Schamber et al. |
| 2010/0060259 A1 | 3/2010 | Vaswani et al. |
| 2010/0061350 A1 | 3/2010 | Flammer, III |
| 2010/0073193 A1 | 3/2010 | Flammer, III |
| 2010/0074176 A1 | 3/2010 | Flammer, III et al. |
| 2010/0074304 A1 | 3/2010 | Flammer, III |
| 2010/0094479 A1 | 4/2010 | Keefe |
| 2010/0103940 A1 | 4/2010 | van Greunen et al. |
| 2010/0109650 A1 | 5/2010 | Briese et al. |
| 2010/0110617 A1 | 5/2010 | Savage et al. |
| 2010/0117856 A1 | 5/2010 | Sonderegger |
| 2010/0128066 A1 | 5/2010 | Murata et al. |
| 2010/0134089 A1 | 6/2010 | Uram et al. |
| 2010/0150059 A1 | 6/2010 | Hughes et al. |
| 2010/0157838 A1 | 6/2010 | Vaswani et al. |
| 2010/0188254 A1 | 7/2010 | Johnson et al. |
| 2010/0188255 A1 | 7/2010 | Cornwall |
| 2010/0188256 A1 | 7/2010 | Cornwall et al. |
| 2010/0188257 A1 | 7/2010 | Johnson |
| 2010/0188258 A1 | 7/2010 | Cornwall et al. |
| 2010/0188259 A1 | 7/2010 | Johnson et al. |
| 2010/0188260 A1 | 7/2010 | Cornwall et al. |
| 2010/0188263 A1 | 7/2010 | Cornwall et al. |
| 2010/0188938 A1 | 7/2010 | Johnson et al. |
| 2010/0192001 A1 | 7/2010 | Cornwall et al. |
| 2010/0217550 A1 | 8/2010 | Crabtree et al. |
| 2010/0286840 A1 | 11/2010 | Powell et al. |
| 2011/0025130 A1 | 2/2011 | Hadar et al. |
| 2011/0032734 A1* | 2/2011 | Melanson ............... H02J 3/381 363/37 |
| 2011/0208366 A1 | 8/2011 | Taft |
| 2012/0041696 A1 | 2/2012 | Sanderford, Jr. et al. |
| 2012/0053751 A1 | 3/2012 | Borresen et al. |
| 2012/0098346 A1 | 4/2012 | Garrity et al. |
| 2012/0136638 A1 | 5/2012 | Deschamps et al. |
| 2012/0221265 A1 | 8/2012 | Arya et al. |
| 2012/0249278 A1 | 10/2012 | Krok et al. |
| 2013/0030579 A1 | 1/2013 | Milosevic et al. |
| 2013/0030591 A1* | 1/2013 | Powell ..................... G05F 1/66 700/295 |
| 2014/0265575 A1 | 9/2014 | Shih et al. |
| 2014/0277788 A1 | 9/2014 | Forbes, Jr. |
| 2014/0277796 A1 | 9/2014 | Peskin et al. |
| 2014/0277813 A1 | 9/2014 | Powell et al. |
| 2014/0277814 A1 | 9/2014 | Hall et al. |
| 2014/0319912 A1 | 10/2014 | Bell |
| 2014/0350743 A1 | 11/2014 | Asghari et al. |
| 2015/0054339 A1 | 2/2015 | Zhao et al. |
| 2015/0088325 A1 | 3/2015 | Forbes, Jr. |
| 2015/0094874 A1 | 4/2015 | Hall et al. |
| 2015/0120078 A1 | 4/2015 | Peskin et al. |
| 2015/0137600 A1 | 5/2015 | Tyler et al. |

(56) References Cited

U.S. PATENT DOCUMENTS

| | | | | |
|---|---|---|---|---|
| 2016/0094034 | A1* | 3/2016 | Divan | H02J 3/18 323/208 |
| 2017/0235323 | A1* | 8/2017 | Divan | G05F 1/70 323/208 |
| 2017/0256944 | A1 | 9/2017 | Hui et al. | |
| 2018/0052478 | A1* | 2/2018 | Varma | H02J 3/1842 |

FOREIGN PATENT DOCUMENTS

| | | | |
|---|---|---|---|
| EP | 0020310 | A1 | 12/1980 |
| JP | S57-148533 | A | 9/1982 |
| JP | 63-299722 | | 12/1988 |
| JP | H10-164756 | A | 6/1998 |
| JP | 2002-247780 | A | 8/2002 |
| JP | 2004-096906 | A | 3/2004 |
| JP | 2006-208047 | A | 8/2006 |
| JP | 2009-33811 | A | 2/2009 |
| JP | 2009-65817 | A | 3/2009 |
| RU | 2066084 | C1 | 8/1996 |
| RU | 2200364 | C2 | 3/2003 |
| SU | 14733008 | | 4/1989 |
| WO | WO-1998/026489 | | 6/1998 |
| WO | WO-2008/003033 | A2 | 1/2008 |
| WO | WO-2008/144860 | A1 | 12/2008 |
| WO | WO-2010/093345 | A1 | 8/2010 |
| WO | WO-2010/129691 | A2 | 11/2010 |
| WO | WO-2014/152408 | A2 | 9/2014 |

OTHER PUBLICATIONS

Belvin, et al., "Voltage Reduction Results on a 24-kV Circuit." 2012 IEEE PES Transmission and Distribution Conference and Exposition (T&D 2012): Orlando, Florida, USA, May 7-10, 2012, IEEE Piscataway, NJ, pp. 1-4.

Bollen et al., "Integration of Distributed Generation in the Power System", Wiley, *IEEE Press*, 2011, 520 pages (Year: 2011).

Bryon Flynn, "Key Smart Grid Applications", *Protection & Control Journal*, Jul. 2009, pp. 29-34.

Dunnett, et al., "Development of Closed Loop Voltage Control Simulator for Medium Voltage Distribution." Power Engineering Conference, 2009, AUPEC 2009, Australasian Universities, IEEE, Piscataway, NJ, USA, Sep. 27, 2009, pp. 1-5.

Ellis et al., "Performance of Distributed Energy Resources During and After System Disturbance: Voltage and Frequency Ride-Through Requirements" A Report by the Integration of Variable Generation Task Force, Dec. 2013, 30 pgs. (Year: 2013).

Extended European Search Report dated Dec. 13, 2016 for European Application No. 14767612.6.

Extended European Search Report dated Jan. 26, 2017 for European Application No. 14769578.7.

Fletcher, R.H. et al., "Integrating Engineering and Economic Analysis of Conservation Voltage Reduction," *Power Engineering Society Summer Meeting, 2002 IEEE* (vol. 2), pp. 725-730.

International Search Report and Written Opinion of the International searching Authority dated Aug. 7, 2014 on related PCT Appln. PCT/US2014/027310.

International Search Report and Written Opinion of the International searching Authority dated Dec. 20, 2010 on related PCT Appln. PCT/US2010/033751.

International Search Report and Written Opinion of the International searching Authority dated Jul. 24, 2014 on related PCT Appln. PCT/US2014/027332.

International Search Report and Written Opinion of the International searching Authority dated Jul. 29, 2014 on related PCT Appln. PCT/US2014/027299.

International Search Report and Written Opinion of the International Searching Authority dated Nov. 3, 2016 on related PCT Appln. PCT/US2016/048206.

International Search Report and Written Opinion of the International searching Authority dated Sep. 5, 2014 on related PCT Appln. PCT/US2014/27361.

Kennedy, P.E. et al., "Conservation Voltage Reduction (CVR) at Snohmish County PUD," *Transactions on Power Systems*, vol. 6, No. 3, Aug. 1991, pp. 986-998.

LaPlace, Carl, et al. "Realizing the Smart Grid of the Future through AMI technology," 14 pages, Jun. 1, 2009.

Paseraba, J., Secondary Voltage-Var Controls Applied to Static Compensators (STATCOMs) for Fast Voltage Control and Long Term Var Management, 2002 IEEE Power Engineering Society Summer Meeting. Jul. 25, 2002. Chicago, IL, vol. 2 pp. 753-761 <DOI: 10.1109/PESS.2002.1043415>.

Peskin, et al. "Conservation Voltage Reduction with Feedback from Advanced Metering Infrastructure." 2012 IEEE PES Transmission and Distribution Conference and Exposition, Orlando, Florida (T&D 2012), No. 7-10, pp. 1-8, May 7, 2012.

Williams, B.R., "Distribution Capacitor Automation Provides Integrated Control of Customer Voltage Levels and Distribution Reactive Power Flow," Southern California Edison Company, Power Industry Computer Application Conference, 1995, Conference Proceedings, pp. 215-220.

Willis, H. L., "Power Distribution Planning Reference Book." Second Edition, Revised and Expanded, Chapter 10, pp. 356-363 and 387, 2004.

Wilson, T. L., "Measurement and Verification of Distribution Voltage Optimization Results for the IEEE Power & Energy Society", 2010, pp. 1-8.

Yang et al., "Wide-Scale Adoption of Photovoltaic Energy: Grid code modifications are explored in the distribution grid" IEEE Industry Applications Magazine 21 (5): 1-10 Å• Aug. 2015 (Year: 2015).

* cited by examiner

SYSTEMS AND METHODS FOR STABILIZER CONTROL

CROSS-REFERENCE TO RELATED APPLICATION

This application is a continuation of U.S. patent application Ser. No. 16/924,347, filed Jul. 9, 2020, which is a continuation of U.S. patent application Ser. No. 15/243,217, filed Aug. 22, 2016, now U.S. Pat. No. 10,732,656, issued Aug. 4, 2020, and claims priority under 35 U.S.C. § 119(e) to U.S. Provisional Patent Application Ser. No. 62/208,894, filed on Aug. 24, 2015, each of which are hereby incorporated by reference in their entirety.

BACKGROUND

The present disclosure relates to a method, an apparatus, a system and a computer program for controlling an electric power system, including controlling the voltage on the distribution circuits with respect to optimizing voltage solely for the purpose of making the electrical delivery system compatible with high variation distributed generation and loads. More particularly, the disclosure relates to a method of optimizing variable load compatibility using advanced metering infrastructure ("AMI")-based data analysis. This method enables the direct control of customer level secondary voltages to optimally enable the electric energy delivery system (EEDS) to maximize its capability to accommodate large amounts of individual and aggregate load variability. The method executes this variable load voltage control using the secondary AMI-based measurements, significantly improving the reliability of the customer voltage measurement and level, enabling the EEDS operator to improve the reliability of customer voltage performance for these types of distributed generation and loads.

The method of the disclosed embodiments is separated into four major steps. The first is to locate the loads with common secondary voltage connections based on voltage correlation analysis from historical data, typical impedances of secondary conductors, and GPS coordinates to estimate distances. The second is to use a novel method to electronically "build" the primary load connections by correlating with the estimated primary voltage drop. The third is to characterize the loads in terms of a linear model. The fourth is to control the independent voltage control variables to select the optimum operation level to maximize the circuit's ability to successfully respond to the load variation affect using a novel method of building a piecewise linear regression model and center the regression model using the independent voltage variables. This optimizes the ability of the circuit to respond to high variation loads.

Electricity is commonly generated at a power station by electromechanical generators, which are typically driven by heat engines fueled by chemical combustion or nuclear fission, or driven by kinetic energy flowing from water or wind. The electricity is generally supplied to end users through transmission grids as an alternating current signal. The transmission grids may include a network of power stations, transmission circuits, substations, and the like.

The generated electricity is typically stepped-up in voltage using, for example, generating step-up transformers, before supplying the electricity to a transmission system. Stepping up the voltage improves transmission efficiency by reducing the electrical current flowing in the transmission system conductors, while keeping the power transmitted nearly equal to the power input. The stepped-up electricity is then transmitted through the transmission system to a distribution system, which distributes the electricity to end users. The distribution system may include a network that carries electricity from the transmission system and delivering it to end users. Typically, the network may include medium-voltage (for example, less than 69 kV) power lines, electrical substations, transformers, low-voltage (for example, less than 1 kV) distribution wiring, electric meters, and the like.

The following, the entirety of each of which is herein incorporated by reference, describe subject matter related to power generation or distribution: Engineering Optimization Methods and Applications, First Edition, G. V. Reklaitis, A. Ravindran, K. M. Ragsdell, John Wiley and Sons, 1983; Estimating Methodology for a Large Regional Application of Conservation Voltage Reduction, J. G. De Steese, S. B. Merrick, B. W. Kennedy, IEEE Transactions on Power Systems, 1990; Power Distribution Planning Reference Book, Second Edition, H. Lee Willis, 2004; Implementation of Conservation Voltage Reduction at Commonwealth Edison, IEEE Transactions on Power Systems, D. Kirshner, 1990; Conservation Voltage Reduction at Northeast Utilities, D. M. Lauria, IEEE, 1987; Green Circuit Field Demonstrations, EPRI, Palo Alto, Calif., 2009, Report 1016520; Evaluation of Conservation Voltage Reduction (CVR) on a National Level, PNNL-19596, Prepared for the U.S. Department of Energy under Contract DE-AC05-76RL01830, Pacific Northwest National Lab, July 2010; Utility Distribution System Efficiency Initiative (DEI) Phase 1, Final Market Progress Evaluation Report, No 3, E08-192 (7/2008) E08-I92; Simplified Voltage Optimization (VO) Measurement and Verification Protocol, Simplified VO M&V Protocol Version 1.0, May 4, 2010; MINITAB Handbook, Updated for Release 14, fifth edition, Barbara Ryan, Brian Joiner, Jonathan Cryer, Brooks/Cole-Thomson, 2005; Minitab Software, http://www.minitab.com/en-US/products/minitab/Statistical Software provided by Minitab Corporation.

Further, U.S. patent application 61/176,398, filed on May 7, 2009 and US publication 2013/0030591 entitled VOLTAGE CONSERVATION USING ADVANCED METERING INFRASTRUCTURE AND SUBSTATION CENTRALIZED VOLTAGE CONTROL, the entirety of which is herein incorporated by reference, describe a voltage control and energy conservation system for an electric power transmission and distribution grid configured to supply electric power to a plurality of user locations.

SUMMARY

Various embodiments described herein provide a novel method, apparatus, system and computer program for controlling an electric power system, including implementation of voltage control using data analysis of AMI-based secondary voltage measurement to control the voltages with respect to optimizing voltage for the specific purpose of making the electrical delivery system compatible with high variation distributed generation and loads such as photovoltaic generation, distributed storage, inverters, electric vehicle charging, and microgrids.

According to an aspect of the disclosure, the voltage control and conservation system (VCC) controls the electrical energy delivery system (EEDS) primary and secondary independent voltage control devices such as load tap changing control (LTC) transformers, voltage regulators, storage, capacitor banks, and distributed generation, which includes, distributed storage, photovoltaic generation, inverters (such as utility-scale and small-scale commercial or domestic inverters) and microgrids to optimize the energy losses while improving the reliability of the voltage delivered to the energy usage system (EUS). The electrical energy delivery system (EEDS) is made up of an energy supply system (ESS) that connects electrically to one or more energy usage systems (EUS). The energy usage system (BUS) supplies voltage and energy to energy usage devices (BUD) at electrical points on an electrical energy delivery system (BEDS) and the EUS is made up of many energy usage devices (BUD) randomly using energy at any given time. The purpose of the energy validation process (VCC) is to operate the voltage levels of the EEDS in a manner that optimizes the energy losses EEDS, EUS and ED. The electrical energy supply to the electrical energy delivery system (EEDS) is measured in watts, kilowatts (kw), or Megawatts (Mw) at the supply point of the ESS and at the energy user system (EUS) or meter point. This measurement records the average usage of energy (AUE) over set time periods such as one hour. The energy and voltage measurements made within the EEDS are communicated back to a central control using a communication network for processing by the VCC which then issues control changes to the primary and secondary voltage control devices to produce more precise and reliable voltage control that optimally minimizes the energy losses for the EEDS.

According to an aspect of the disclosure, the VCC measures the exception reports from the AMI meters at the energy utilization system (EUS) and looks for a set pattern of voltage changes that relate to a high variability load at one or multiple locations. In another aspect of the disclosure, a pattern of voltage changes may also be determined from AMI or sensor load or voltage data, as well as distributed generation systems, such as inverters. Once detected the VCC responds by changing from energy efficiency and demand savings mode to high compatibility mode. This is triggered by the detection of the high variability pattern from the voltage exception data. Specific responses are made to move the EEDS from operating in an "energy efficiency mode" to operating in a "high variability mode" by adjusting the independent voltage controls for the EEDS. The VCC then maximizes the ability of the EEDS to respond to the high variability event and remains in this mode until the risk to voltage excursions is over. In another aspect, the VCC may also receive and measure periodic reports from the AMI, for example once every 15 minutes, in order and proactively adjust independent voltage controls for the EEDS. The VCC can integrate voltage data from AMI meters and assess the state of the grid and initiate appropriate voltage control actions to hedge against predictable voltage risks.

According to a further aspect of the disclosure, the energy validation process (EVP) measures the level of change in energy usage for the electrical energy delivery system (EEDS) that is made up of an energy supply system (ESS) that connects electrically to one or more energy usage systems (EUS). The test for the level of change in energy use improvement is divided into two basic time periods: The first is the time period when the VCC is not operating, i.e., in the "OFF" state. The second time period is when the VCC is operating, i.e., in "ON" state. Two variables must be determined to estimate the savings capability for an improvement in the EEDS: The available voltage change in voltage created by the VCC and the EEDS capacity for energy change with respect to voltage change or the CVR factor. The average change in voltage is determined by direct measurement on the advanced metering infrastructure (AMI). The details regarding the calculation of the CVR factor and average voltage change are described in co-pending patent application No. 61/789,085, entitled ELECTRIC POWER SYS ELM CONTROL WITH MEASUREMENT OF ENERGY DEMAND AND ENERGY EFFICIENCY USING T—DISTRIBUTIONS, filed on Mar. 15, 2013 ("the '085 application"), the entirety of which is incorporated herein.

According to an aspect of the disclosure, the energy planning process (EPP) projects the voltage range capability of a given electrical energy delivery system (EEDS) (made up of an energy supply system (ESS) that connects electrically via the electrical energy distribution connection system (EEDCS) to one or more energy usage systems (EUS)) at the customer secondary level (the EUS) by measuring the level of change in energy usage from voltage management for the EEDS. The EPP can also determine potential impacts of proposed modifications to the equipment and/or equipment configuration of the EEDS and/or to an energy usage device (EUD) at some electrical point(s) on an electrical energy delivery system (EEDS) made up of many energy usage devices randomly using energy at any given time during the measurement. The purpose of the energy validation process (EVP) is to measure the level of change in energy usage for the EEDS for a change in voltage level. The specifics of the EVP are covered in the '085 application. One purpose of the EPP system of the disclosed embodiments is to estimate the capability of the EEDS to accommodate voltage change and predict the level of change available. The potential savings in energy provided by the proposed modification to the system can be calculated by multiplying the CVR factor (% change in energy/% change in voltage) (as may be calculated by the EVP, as described in the '085 application) by the available change in voltage (as determined by the EPP) to determine the available energy and demand savings over the time interval being studied. The electrical energy supply to the electrical energy delivery system (EEDS) is measured in watts, kilowatts (kw), or Megawatts (Mw) (a) at the supply point of the ESS and (b) at the energy user system (EUS) or meter point. This measurement records the average usage of energy (AUE) at each of the supply and meter points over set time periods such as one hour.

The test for energy use improvement is divided into two basic time periods: The first is the time period when the improvement is not included, i.e., in "OFF" state. The second time period is when the improvement is included, i.e., in "ON" state. Two variables must be determined to estimate the savings capability for a modification in the EEDS: The available voltage change in voltage created by the modification and the EEDS capacity for energy change with respect to voltage change (the CVR factor, the calculation of which is described in the '085 application).

According to an aspect of the disclosure, the energy planning process (EPP) projects the ability of the EEDS to respond to high variability load events such as photovoltaic (PV) cloud transients or microgrid generation changes. The EPP constructs a primary model of the EEDS in a general format to calculate voltage drops for the primary EEDS connections. Then the historical AMI data is used to estimate the secondary connections from AMI meter to source service transformer and to the source transformer voltage using specific voltage correlation analysis. In addition voltage "on" to "off" states at the primary ESS metering point are correlated the secondary AMI voltages using a paired t distribution. This method allows checking of EEDS primary and secondary connectivity that can be combined with the secondary measurements to eliminate connectivity errors using the GIS mapping. This high level EEDS primary mapping allows a linear model to be constructed relating the ESS input voltages and power to the EUS output voltages electronically and enables checking for errors in the GIS and Planning model connectivity model.

According to a further aspect of the disclosure, the VCC uses the EVP and the EPP to enable the full optimization of the voltage, both during planning and construction of the EEDS components and during the operation of the EEDS by monitoring the EVP process to detect when the system changes its efficiency level. When these three processes (VCC, EVP and EPP) are operating together, it is possible to optimize the construction and the operation of the EEDS. The EPP optimizes the planning and construction of the EEDS and its components and the EVP is the measurement system to allow the VCC to optimize the operation of the EEDS. The EPP provides the configuration information for the VCC based on the information learned in the planning optimization process. This full optimization is accomplished across the energy efficiency, demand management and the voltage reliability of the EEDS. See also, co-pending patent application No. 61/800,028, entitled MANAGEMENT OF ENERGY DEMAND AND ENERGY EFFICIENCY SAVINGS FROM VOLTAGE OPTIMIZATION ON ELECTRIC POWER SYSTEMS USING AMI-BASED DATA ANALYSIS, filed on Mar. 15, 2013 ("the '028 application"), the entirety of which is incorporated herein.

According to a further aspect of the disclosure, the VCC uses the EVP and the EPP to enable the full optimization of the voltage in both the construction of the EEDS components and during the operation of the EEDS by monitoring the VCC process to detect when the system needs to change from high efficiency mode to high compatibility mode (HVL mode) to accommodate high variation loading (HVL). High variation loading may occur due to cloud transients from Solar PV (e.g., when photovoltaic device systems connected to the grid experiences cloud cover and stop generating power, adding large loads to the grid all at once), charging electric cars (e.g., when many customers are charging their cars at once), or microgrid generation changes. This high speed detection of the need to change to high compatibility mode initiates a process to move the independent voltage control variables to a point that maximizes the ability of the EEDS to reliably deliver power and accommodate the high variability loads. The process of response is developed in the EPP process on a block control level starting with the position of the higher speed voltage elements such as the capacitor banks and then moving to the LTC transformers and the line regulators.

According to a further aspect of the disclosure, the EEDS can be represented as a linear model over the restricted voltage range of operational voltages allowed for the EUS. This narrow band of operation is where the optimization solution must occur, since it is the band of actual operation of the system. The linear models are in two areas. The first area for use of linear models is that energy loss for the EEDCS primary and secondary equipment losses can be represented in linear form using some simple approximations for EEDCS characteristics of voltage and energy. This second approximation is that the voltage and energy relationship of the EUS can be represented by the CVR factor and the change in voltage over a given short interval. This allows the entire loss function for the EEDS over reasonably short interval and narrow ranges of voltage (+/−10%) to be represented as linear functions of measureable voltages at the ESS and the EUS. This linear relationship greatly reduces the complexity of finding the optimum operating point to minimize energy use on the EEDS. The second area for use of linear models is an approximation that the EUS voltages can be represented by linear regression models based only on the EUS voltage and energy measurements. These two approximations greatly reduce the optimization solution to the EEDS VCC, making the optimization process much simpler.

The calculation of the change in voltage capability is the novel approach to conservation voltage reduction planning using a novel characterization of the EEDS voltage relationships that does not require a detailed loadflow model to implement. The input levels to the EEDCS from the ESS are recorded at set intervals, such as one hour periods for the time being studied. The input levels to the EUS from the EEDCS, at the same intervals for the time being studied, are measured using the AMI system and recorded. The EEDS specific relationship between the ESS measurements and the EUS usage measurements is characterized using a linear regression technique over the study period. This calculation specifically relates the effects of changes in load at the ESS to change in voltage uniquely to each customer EUS using a common methodology.

Once these linear relationships have been calculated, a simple linear model is built to represent the complex behavior of voltage at various loading levels including the effects of switching unique EUS specific loads that are embedded in the AMI collected data (e.g., the data includes the "ON" and "OFF" nature of the load switching occurring at the EUS). Then, the linear model for the voltages is passed to the VCC for determining the normal operation of the EUS for specific conditions at the ESS. Using this simple linear model is a novel method of planning and predicting the voltage behavior of an EEDS caused by modifications to the EEDS by using the VCC.

The relationships between the modification (e.g., adding/removing capacitor banks, adding/removing regulators, reducing impedance, or adding/removing/configuring distributed generation) are developed first by using a simple system of one ESS and a simple single phase line and a single EUS with a base load and two repeating switched loads. By comparing a traditional primary loadflow model of the simplified EEDS to the linear statistical representation of the voltage characteristics, the linear model changes can be obtained to relate the EUS voltage changes resulting from capacitor bank operation. Once this is done, the effects on the EUS voltage can be forecasted by the VCC and used to determine whether the optimum operating point has been reached.

Once the linear model is built then the model can be used to apply simple linear optimization to determine the best method of controlling the EEDS to meet the desired energy efficiency, demand and reliability improvements.

According to a further aspect of the disclosure, the energy planning process (EPP) can be used to take the AMI data from multiple AMI EUS points and build a linear model of the voltage using the linearization technique. These multiple point models can be used to predict voltage behavior for a larger radial system (e.g., a group of contiguous transmission elements that emanate from a single point of connection) by relating the larger system linear characteristics to the system operation of capacitor banks, regulators, and LTC transformers. With the new linear models representing the operation of the independent variables of the EEDS, the optimization can determine the optimum settings of the independent variables that will minimize the linear model of the EEDS losses. These optimum control characteristics are passed from the EVP to the VCC in the configuration process.

According to a further aspect of the disclosure, the energy planning process (EPP) can be used to take the AMI data from multiple AMI EUS points and build a linear model of the voltage using the linearization technique. These multiple point models can be used to predict voltage behavior for a larger radial system by relating the larger system linear characteristics to the system operation of capacitor banks, regulators, and LTC transformers. With the new linear models representing the operation of the independent variables of the EEDS, the optimization can determine the optimum settings of the independent variables that will maximize the linear model of the EEDS to withstand high variation loads. These optimum control characteristics are passed from the EVP to the VCC in the configuration process.

According to a further aspect of the disclosure, the energy planning process (EPP) can be used to take the AMI data from multiple AMI EUS points and multiple ESS points and build a linear model of the voltage using the linearization technique. The linear model that exists for normal operation can be determined based on the characteristics of the linearization. Using this normal operation model as a "fingerprint", the other EUS points on the EEDS can be filtered to determine the ones, if any, that are displaying abnormal behavior characteristics and the abnormal EUS points can be compared against a list of expected characteristics denoting specific abnormal behavior that represents the potential of low reliability performance. As an example, the characteristics of a poorly connected meter base has been characterized to have certain linear characteristics in the model. The observed linear characteristics that represent this abnormal condition can be used to identify any of the EUS meters that exhibit this behavior, using the voltage data from AMI. This allows resolution of the abnormality before customer equipment failure occurs and significantly improves the reliability of the EEDS. A set of the voltage fingerprints will be passed by the EVP to the VCC in the configuration process. The EPP can then use this recognition to provide alarms, change operation level for efficiency, demand or reliability improvement.

According to a further aspect of the disclosure, the energy planning process (EPP) can be used to take the AMI data from multiple AMI EUS points and multiple ESS points and build a linear model of the voltage using the linearization technique. Using this model and the measured AMI data the EPP can be used to project the initial group of monitored meters that can be used in the voltage management system to control the minimum level of voltage across the EEDS for implementation of CVR. This information is passed from the EPP to the VCC in the configuration process.

According to a further aspect of the disclosure, the energy planning process (EPP) can be used to take the AMI data from multiple AMI EUS points and multiple ESS points and build a linear model of the voltage using the linearization technique. Using this model and the measured AMI data, the EPP can be used to project the high variability group of monitored meters that can be used initially in the voltage management system to control the detection of the high variability loads and change the mode of VCC operation from energy efficiency and demand control to high variability load compatibility. This is done by developing a piecewise linear model of the high variability loads and using the independent voltage variables to move the VCC voltage level to the midpoint of this high variability control range. This information is passed from the EPP to the VCC in the configuration process.

According to a further aspect of the disclosure, the energy planning process (EPP) can be used to take the AMI data from multiple AMI EUS points and multiple ESS points and build a linear model of the voltage using the linearization technique. The voltage data can be used to provide location information about the meter connection points on the circuit using voltage correlation analysis. This method matches the voltages by magnitude and by phase using a technique that uses the voltage data for each meter to provide the statistical analysis. Common phase voltage movement is correlated and common voltage movement by circuit is identified using linear regression techniques. This information is provided by the EPP to the VCC in the configuration process and used to detect when voltages in the monitored group are not from the EEDS being controlled. This enables the VCC to stop control and return itself to a safe mode until the problem is resolved.

According to a further aspect of the disclosure, the VCC samples the monitored group voltages at the EUS and uses the linear models to project the required level of independent variables required to make the EUS voltages remain in the required voltage band based on the linear regression model for the EUS location. This sampling also allows the VCC to determine when the samples are greatly deviating from the linear regression model and enable alarming and change of VCC state to maintain reliability of the EEDS.

According to a further aspect of the disclosure, the devices that represent the voltage regulation on the circuit, LTC transformers, regulators, and distributed generation are assigned non overlapping zones of control in the EEDS. In each zone there is one parent device and for the EEDS there is also one substation parent device (node parent device) that controls all other zones and devices. The EEDS topology determines which zones are secondary to the node zone and the relationship to other zones. In each of these zones there are other independent devices that form child devices such as capacitor banks. These are controlled by their zone parent control. The control processing proceeds by zone topology to implement the optimization process for the EEDS. For each zone control device and child device a monitored group of meters are assigned and used to initiate control point changes that implement the optimization process for the EEDS. This control process only requires the configuration information from the EPP and measurements of voltages from the monitored meters at the EUS and measurements of the meters at the ESS to determine the optimization and control the independent devices/variables of the optimization solution. In another aspect, distributed generation devices, such as distributed storage, photovoltaic generation, and their associated equipment including inverters or other devices, are assigned to non-overlapping blocks of control in the EEDS.

According to a further aspect of the disclosure, the devices that represent the voltage regulation on the circuit (e.g., LTC transformers, regulators, and distributed generation) are assigned non-overlapping zones of high load variation control in the EEDS. In each zone, there is one parent device and for the EDDS there is also one substation parent device (node parent device) that controls all other zones and devices. The EEDS topology determines which zones are secondary to the node zone and the relationship to other zones. In each of these zones there are other independent devices that form child devices such as capacitor banks. These are controlled by their zone parent high load variation control. The control processing proceeds by zone topology to implement the optimization process for the EDDS. For each zone control device and child device, a high variation mode monitored group of meters are assigned and used to initiate control point changes that implement the high load variation optimization process for maximizing the amount of high load variation capability for the EEDS. This control process only requires the configuration information from the EPP and measurements of voltages from the high load variation bellwether meters at the EUS and measurements of the meters at the ESS to determine the optimization and control the independent devices/variables of the optimization solution. In another aspect, distributed generation devices, such as distributed storage, photovoltaic generation, and inverters, are assigned to non-overlapping blocks of control in the EEDS.

According to a further aspect of the disclosure, the non-monitored meters in the EEDS provide voltage exception reporting (see the US 2013/0030591 publication) that is used to re-select meters that are detected to be below the existing monitored group level for any device and connect them to the monitored group and disconnect meters that are not representing the lowest/highest of the meters in the EEDS. Monitored groups are maintained to track the upper and lower operating levels of the control device block where the total population of meters affected by the device reside.

According to a further aspect of the disclosure, the non-monitored meters in the EEDS provide voltage exception reporting (see the US 2013/0030591 publication) that is used to re-select the representative high reliability meters that are detecting the high variability load conditions and connect them to the high load variability bellwether group and disconnect meters that are not representing the lowest/highest of the meters in the EEDS. Monitored groups are maintained to track the upper and lower operating levels of the control device block where the total population of meters affected by the device reside.

According to a further aspect of the disclosure, the non-monitored meters in the EEDS provide voltage data, for example over a 24 hour period, for inclusion in load profiles. The data from the monitored meters may also be used in the load profiles. The load profiles are used to assess the state of the grid and initiate appropriate voltage control actions to hedge against predictable voltage risks.

According to a further aspect of the disclosure, the solution to the optimization of the EEDS is determined. The first step is to define the boundary of the optimization problem. The optimization deals with the EEDS, the ESS, the EEDCS, the EUS and the ED and involves the voltage and energy relationships in these systems. The second step is to determine the performance criterion. This performance criterion is the energy loss from the ESS to the EUS that occurs in the EEDCS and the energy loss in the EUS and ED from CVR. The first loss is normally less than 5% of the total controllable losses from the voltage optimization. The second energy loss is the conservation voltage reduction loss in the EUS that is a combination of all of the CVR losses in the ED connected to the EUS point and is normally 95% of the potential controllable losses. The performance criterion is to minimize these two losses while maintaining or increasing the reliability of the voltage at the EUS and ED. The third steps to determine the independent variable in the optimization problem. The independent variables are the voltages being controlled by the LTC transformers, the voltage regulators, the capacitor bank position, and the EUS/EDS voltage control such as distributed generation voltage controllers or inverter output settings. Each of these are specifically represented in the control by the VCC. The next step is creating the system model. The linear model of the losses represent the performance criterion model. The linear model of the ESS to EUS voltages represents the system model for the EEDCS. The final step is to determine the constraints. In this case, the constraints are the voltage range limits on the EUS and ED which are based on the appropriate equipment and operating standards.

The following assumptions were made to evaluate the optimization solution. First, it is assumed that the loads are evenly distributed by block, as defined in the VCC. This is a very reliable assumption since the blocks can be specifically selected. The second is that there is a uniformity between the percentage ESS voltage drop on the primary and the percentage EUS voltage drop on the secondary. With these two assumptions, it is shown that the model is monotonic, decreasing with voltage and with the slope of the voltage on the EEDCS. This means that the reduction in control voltage at the independent variable points always results in a decrease in the voltage at the EUS and a resulting decrease in the losses and if the slope of the voltage is minimized by the capacitor bank position simultaneously, then the application of linear optimization technique shows that the optimum will always occur at a boundary condition. This means that the first boundary condition that is encountered will identify the optimum operating point for the ED to minimize losses. The VCC is an implementation of a control process that implements the search for this boundary condition to assure optimum loss operation base on voltage control.

According to a further aspect of the disclosure, if a high variation load event detected, the solution to the optimization of the EEDS high compatibility mode is determined. The first step is the determination of the aggregated piecewise linear model of the high variability loads represented in the high load variability bellwether group. The optimization deals with the EEDS, the ESS, the EEDCS, the EUS and the ED and involves the voltage and energy relationships in these systems. The second step is to determine the performance criterion. This performance criterion is the maximum energy change compatibility from the ESS to the EUS that maintains save voltage drops in the EEDCS and the in the EUS and ED from the high variability loads. The primary voltage drops accumulate events that affect multiple high variability loads at the same time, such as cloud transients for solar panels (PV devices). The performance criterion is to maximize the available voltage drop in the primary and secondary for these events while maintaining or increasing the reliability of the voltage at the EUS and ED. The third step is to determine the optimum state of the independent variable in the optimization problem. The independent variables are the voltages being controlled by the LTC transformers, the voltage regulators, the capacitor bank position, and the EUS/ED voltage control such as distributed generation voltage controllers or inverter output settings. Each of these are specifically represented in the control by the VCC. For the high load variability event, the voltage controllers are moved to the center of the piecewise linear representation of the high variability loads after the block voltage slopes are minimized by the capacitor bank positions to maximize the available voltage drop capability for the EEDS. The next step is the system model. The linear model of the voltage drops from the high variability loads represents the performance criterion model. The linear model of the ESS to EUS voltages represents the system model for the EEDCS. The final step is to determine the constraints. In this case the constraints are the voltage range limits on the EUS and ED which are based on the appropriate equipment and operating standards.

The following assumptions were made to evaluate the optimization solution. First it is assumed that the loads are evenly distributed by block as defined in the VCC. This is a very reliable assumption since the blocks can be selected. The second assumption is either that there is a uniformity between the percentage ESS voltage drop on the primary and the percentage EUS voltage drop on the secondary, or that a primary model has been built from the GPS and AMI data to adequately estimate the voltage drop percentages between the primary and secondary of the EEDS. With these two assumptions, it is shown that the model is monotonic decreasing with voltage and monotonic increasing with the slope of the voltage on the EEDCS. This means that the reduction in control voltage at the independent variable points always results in a decrease in the voltage at the EUS and a resulting decrease in the voltage drop capability and if simultaneously the slope of the voltage is minimized by the capacitor bank position then the application of linear optimization technique shows that the optimum will always occur at a minimum slope between control blocks. The VCC is an implementation of a control process that implements the search for the voltage that maximizes the tolerance of the EEDS to voltage rise or drop by using the center of the piecewise linear regression model to assure optimum capability operation based on voltage control.

According to a further aspect of the disclosure, the VCC combines the optimization of the EPP and the optimization of the VCC to produce a simultaneous optimization of both the BEDS design and construction with the VCC operating optimization, to produce a continuous improvement process that cycles through the overall voltage optimization of energy efficiency, energy demand, and high variation load capacity when needed for the EEDS using a Plan, Manage, and Validate process. This continuous improvement process adapts the optimization to the continuously changing EEDS load environment completing the Voltage Optimization process.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
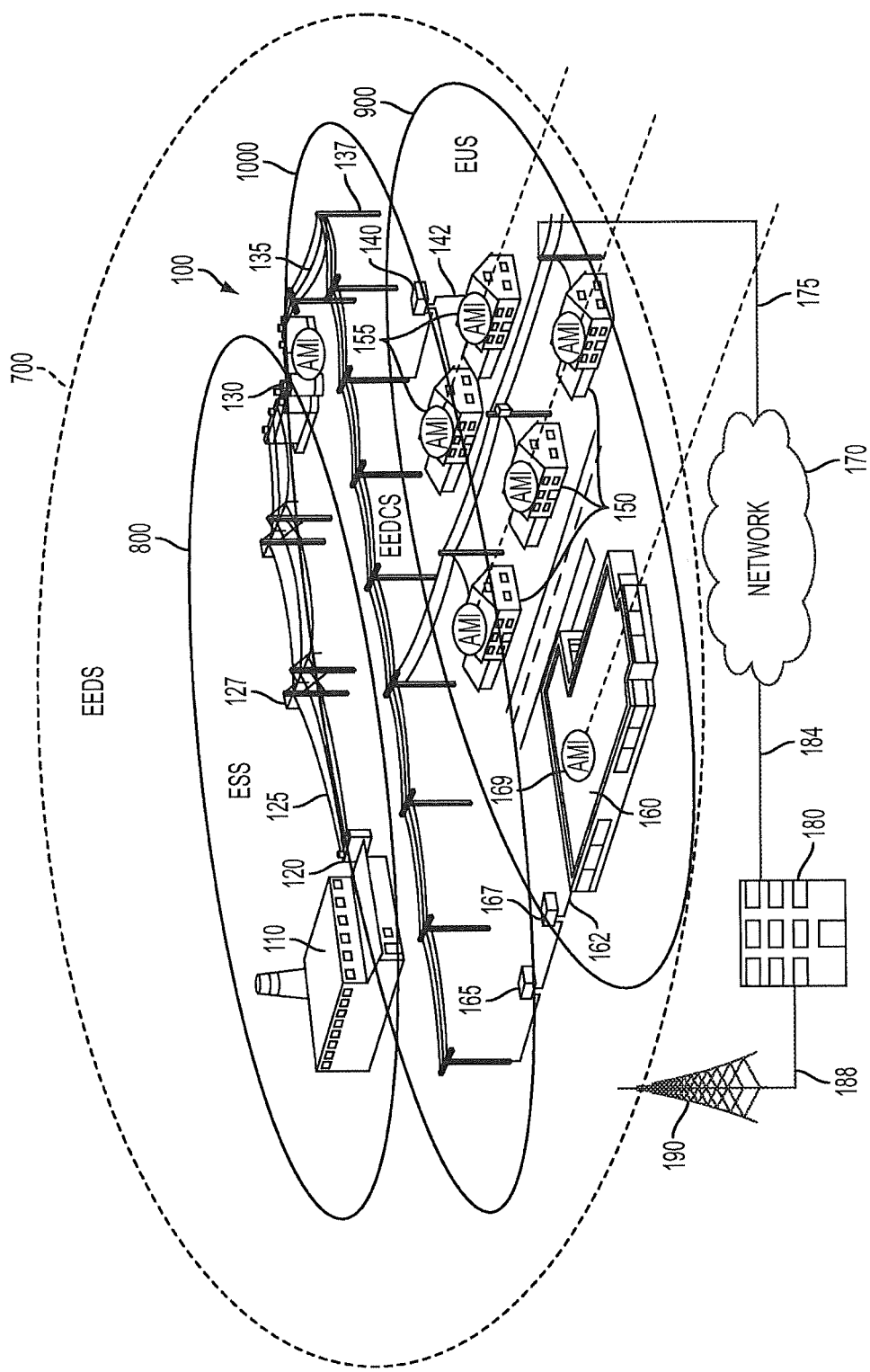
FIG. 1 shows an example of an EEDS made up of an electricity generation and distribution system connected to customer loads, according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. At least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Figure 2:
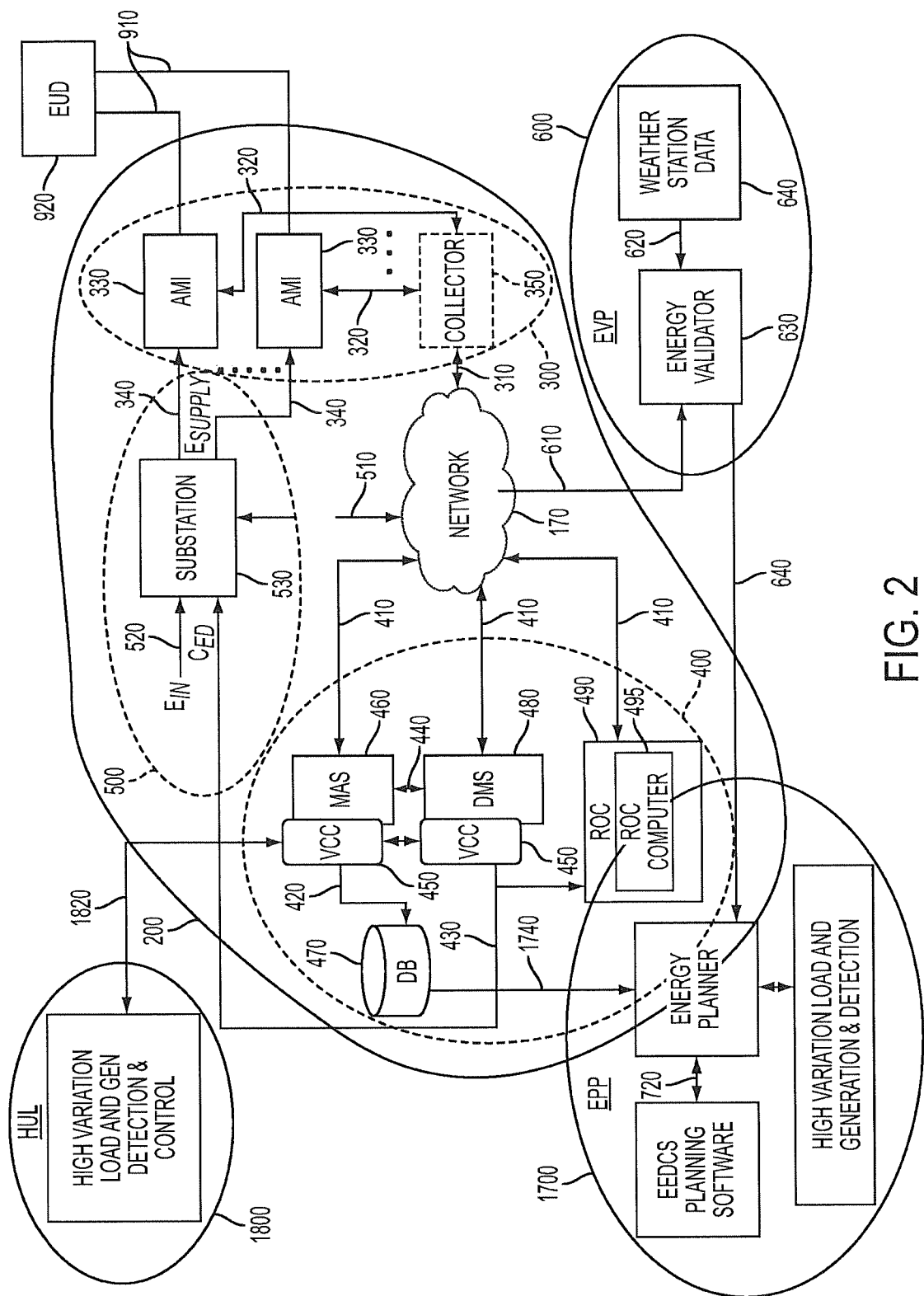
FIG. 2 shows an example of a voltage control and conservation (VCC) system combined with an energy validation process (EVP) and an energy planning process (EPP) that is being measured at the ESS meter point and the EUS meter point made up of Advanced Metering Infrastructure (AMI) measuring voltage and energy, according to the principles of the disclosure.

According to one non-limiting example of the disclosure, a voltage control and conservation (VCC) system 200 is provided (shown in FIG. 2) and the EVP 600 is used to monitor the change in EEDS energy from the VCC 200. The VCC 200, includes three subsystems, including an energy delivery (ED) system 300, an energy control (EC) system 400, an energy regulation (ER) system 500. Also shown in FIG. 2 are an energy validation (EVP) system 600 and an energy planning process (EPP) system 1700. The VCC system 200 is configured to monitor energy usage at the ED system 300 and determine one or more energy delivery parameters at the EC system (or voltage controller) 400. The EC system 400 may then provide the one or more energy delivery parameters $C_{ED}$ to the ER system 500 to adjust the energy delivered to a plurality of users for optimal maximum energy conservation. The EVP system 600 monitors through communications link 610 all metered energy flow and determines the change in energy resulting from a change in voltage control at the ER system 500. The EVP system 600 also reads weather data information through a communication link 620 from an appropriate weather station 640 to execute the EVP process 630. The EVP system 600 is more fully described in the '085 application.

The EPP system 1700 reads the historical databases 470 via communication link 1740 for the AMI data. The EPP system 1700 can process this historical data along with measured AMI data to identify problems, if any, on the EEDS system 700. The EPP system 1700 is also able to identify any outlier points in the analysis caused by proposed optimal system modifications and to identify the initial meters to be used for monitoring by VCC system 200 until the adaptive process (discussed in the US 2013/0030591 publication) is initiated by the control system.

The VCC system 200 is also configured to monitor via communication link 610 energy change data from EVP system 600 and determine one or more energy delivery parameters at the EC system (or voltage controller) 400. The EC system 400 may then provide the one or more energy delivery parameters $C_{ED}$ to the ER system 500 to adjust the energy delivered to a plurality of users for maximum energy conservation. Similarly, the EC system 400 may use the energy change data to control the EEDS 700 in other ways. For example, components of the EEDS 700 may be modified, adjusted, added or deleted, including the addition of capacitor banks, modification of voltage regulators, modification to inverter output settings; changes to end-user equipment to modify customer efficiency, and other control actions.

The VCC system 200 may be integrated into, for example, an existing load curtailment plan of an electrical power supply system. The electrical power supply system may include an emergency voltage reduction plan, which may be activated when one or more predetermined events are triggered. The predetermined events may include, for example, an emergency, an overheating of electrical conductors, when the electrical power output from the transformer exceeds, for example, 80% of its power rating, or the like. The VCC system 200 is configured to yield to the load curtailment plan when the one or more predetermined events are triggered, allowing the load curtailment plan to be executed to reduce the voltage of the electrical power supplied to the plurality of users.

FIG. 1 is similar to FIG. 1 of US publication 2013/0030591, with overlays that show an example of an EEDS 700 system, including an ESS system 800, an EUS system 900 and an EEDCS system 1000 based on the electricity generation and distribution system 100, according to principles of the disclosure. The electricity generation and distribution system 100 includes an electrical power generating station 110, a generating step-up transformer 120, a substation 130, a plurality of step-down transformers 140, 165, 167, and users 150, 160. The electrical power generating station 110 generates electrical power that is supplied to the step-up transformer 120. The step-up transformer steps-up the voltage of the electrical power and supplies the stepped-up electrical power to an electrical transmission media 125. The ESS 800 includes the station 110, the step-up transformer 120, the substation 130, the step-down transformers 140, 165, 167, the ER 500 as described herein, and the electrical transmission media, including media 125, for transmitting the power from the station 110 to users 150, 160. The EUS 900 includes the ED 300 system as described herein, and a number of energy usage devices (EUD) 920 that may be consumers of power, or loads, including customer equipment and the like. The EEDCS system 1000 includes transmission media, including media 135, connections and any other equipment located between the ESS 800 and the EUS 900.

As seen in FIG. 1, the electrical transmission media may include wire conductors, which may be carried above ground by, for example, utility poles 127, 137 and/or underground by, for example, shielded conductors (not shown). The electrical power is supplied from the step-up transformer 120 to the substation 130 as electrical power $E_{In}(t)$, where the electrical power $E_{In}$ in MegaWatts (MW) may vary as a function of time t. The substation 130 converts the received electrical power $E_{In}(t)$ to $E_{Supply}(t)$ and supplies the converted electrical power $E_{Supply}(t)$ to the plurality of users 150, 160. The substation 130 may adjustably transform the voltage component $V_{In}(t)$ of the received electrical power $E_{In}(t)$ by, for example, stepping-down the voltage before supplying the electrical power $E_{Supply}(t)$ to the users 150, 160. The electrical power $E_{Supply}(t)$ supplied from the substation 130 may be received by the step-down transformers 140, 165, 167 and supplied to the users 150, 160 through a transmission medium 142, 162, such as, for example, but not limited to, underground electrical conductors (and/or above ground electrical conductors).

Each of the users 150, 160 may include an Advanced Meter Infrastructure (AMI) 330. The AMI 330 may be coupled to a Regional Operations Center (ROC) 180. The ROC 180 may be coupled to the AMI 330, by means of a plurality of communication links 175, 184, 188, a network 170 and/or a wireless communication system 190. The wireless communication system 190 may include, but is not limited to, for example, an RF transceiver, a satellite transceiver, and/or the like.

The network 170 may include, for example, at least one of the Internet, a local area network (LAN), a wide area network (WAN), a metropolitan area network (MAN), a personal area network (PAN), a campus area network, a corporate area network, the electrical transmission media 125, 135 and transformers 140, 165, 167, a global area network (GAN), a broadband area network (BAN), or the like, any of which may be configured to communicate data via a wireless and/or a wired communication medium. The network 170 may be configured to include a network topology such as, for example, a ring, a mesh, a line, a tree, a star, a bus, a full connection, or the like.

The AMI 330 may include any one or more of the following: A smart meter, smart inverter (SI) or other sensor to measure a component of electrical power; a network interface (for example, a WAN interface, or the like); firmware; software; hardware; and the like. The AMI 330 may be a standalone device, such as a meter, or incorporated into power control equipment, such as transformer, capacitor banks, or inverters. The AMI may be configured to determine any one or more of the following: kilo-Watt-hours (kWh) delivered; kWh received; kWh delivered plus kWh received; kWh delivered minus kWh received; interval data; demand data; voltage; current; phase; and the like. If the AMI is a three phase meter, then the low phase voltage may be used in the average calculation, or the values for each phase may be used independently. If the meter is a single phase meter, then the single voltage component will be averaged.

The AMI 330 may further include one or more collectors 350 (shown in FIG. 2) configured to collect AMI data from one or more AMIs 330 tasked with, for example, measuring and reporting electric power delivery and consumption at one or more of the users 150, 160. Alternatively (or additionally), the one or more collectors may be located external to the users 150, 160, such as, for example, in a housing holding the step-down transformers 140, 165, 167. Each of the collectors may be configured to communicate with the ROC 180.

The VCC system 200 plugs into the DMS and AMI systems to execute the voltage control function. In addition the EVP system 600 collects weather data and uses the AMI data from the ESS system 800 to calculate the energy savings level achieved by the VCC system 200. In addition the EPP system 1700 provides a process to continually improve the performance of the EEDS by periodically reviewing the historical AMI voltage data and providing identification of problem EUS voltage performance and the modifications needed to increase the efficiency and reliability of the EEDS system 700, using the VCC system 200.

VCC System 200

FIG. 2 shows an example of the VCC system 200 with the EVP system 600 monitoring the change in energy resulting from the VCC controlling the EEDS in the more efficient lower 5% band of voltage, according to principles of the disclosure. The VCC system 200 includes the ED system 300, the EC system 400 and the ER system 500, each of which is shown as a broken-line ellipse. The VCC system 200 is configured to monitor energy usage at the ED system 300. The ED system 300 monitors energy usage at one or more users 150, 160 (shown in FIG. 1) and sends energy usage information to the EC system 400. The EC system 400 processes the energy usage information and generates one or more energy delivery parameters $C_{ED}$, which it sends to the ER system 500 via communication link 430. The ER system 500 receives the one or more energy delivery parameters $C_{ED}$ and adjusts the electrical power $E_{Supply}(t)$ supplied to the users 150, 160 based on the received energy delivery parameters $C_{ED}$. The EVP system 600 receives the weather data and the energy usage data and calculates the energy usage improvement from the VCC 200.

The VCC system 200 minimizes power system losses, reduces user energy consumption and provides precise user voltage control. The VCC system 200 may include a closed loop process control application that uses user voltage data provided by the ED system 300 to control, for example, a voltage set point $V_{SP}$ on a distribution circuit (not shown) within the ER system 500. That is, the VCC system 200 may control the voltages $V_{Supply}(t)$ of the electrical power $E_{Supply}(t)$ supplied to the users 150, 160, by adjusting the voltage set point $V_{SP}$ of the distribution circuit in the ER system 500, which may include, for example, one or more load tap changing (LTC) transformers, one or more voltage regulators, or other voltage controlling equipment to maintain a tighter band for optimization of the operation of the voltages $V_{Delivered}(t)$ of the electric power $E_{Delivered}(t)$ delivered to the users 150, 160, to lower power losses and facilitate efficient use of electrical power $E_{Delivered}(t)$ at the user locations 150 or 160.

The VCC system 200 optimally controls or adjusts the voltage $V_{Supply}(t)$ of the electrical power $E_{Supply}(t)$ supplied from the EC system 500 based on AMI data, which includes measured voltage $V_{Meter}(t)$ data from the users 150, 160 in the ED system 300, and based on validation data from the EVP system 600 and information received from the EPP system 1700. The VCC system 200 may adjust the voltage set point $V_{SP}$ at the substation or line regulator level in the ER system 500 by, for example, adjusting the LTC transformer (not shown), circuit regulators (not shown), or the like, to maintain the user voltages $V_{Meter}(t)$ in a target voltage band V Band-n, which may include a safe nominal operating range.

The VCC system 200 is configured to maintain the electrical power $E_{Delivered}(t)$ delivered to the users 150, 160 within one or more voltage bands $V_{Band-n}$. For example, the energy may be delivered in two or more voltage bands $V_{Band-n}$ substantially simultaneously, where the two or more voltage bands may be substantially the same or different. The value $V_{Band-n}$ may be determined by the following expression [1]:

$$V_{Band-n} = V_{SP} + \Delta V \quad [1]$$

where $V_{Band-n}$ is a range of voltages, n is a positive integer greater than zero corresponding to the number of voltage bands V Band that may be handled at substantially the same time, $V_{SP}$ is the voltage set point value and $\Delta V$ is a voltage deviation range.

For example, the VCC system 200 may maintain the electrical power $E_{Delivered}(t)$ delivered to the users 150, 160 within a band $V_{Band-1}$ equal to, for example, 111V to 129V for rural applications, where $V_{SP}$ is set to 120V and $\Delta V$ is set to a deviation of seven-and-one-half percent (+/−7.5%). Similarly, the VCC system 200 may maintain the electrical power $E_{Delivered}(t)$ delivered to the users 150, 160 within a band $V_{Band-2}$ equal to, for example, 114V to 126V for urban applications, where $V_{SP}$ is set to 120V and $\Delta V$ is set to a deviation of five (+/−5%).

The VCC system 200 may maintain the electrical power $E_{Delivered}(t)$ delivered to the users 150, 160 at any voltage band $V_{Band-n}$ usable by the users 150, 160, by determining appropriate values for $V_{SP}$ and $\Delta V$. In this regard, the values $V_{SP}$ and $\Delta V$ may be determined by the EC system 400 based on the energy usage information for users 150, 160, received from the ED system 300.

The EC system 400 may send the $V_{SP}$ and $\Delta V$ values to the ER system 500 as energy delivery parameters $C_{ED}$, which may also include the value $V_{Band-n}$. The ER system 500 may then control and maintain the voltage $V_{Delivered}(t)$ of the electrical power $E_{Delivered}(t)$ delivered to the users 150, 160, within the voltage band $V_{Band-n}$. The energy delivery parameters CEO may further include, for example, load-tap-changer (LTC) control commands.

The EVP system 600 may further measure and validate energy savings by comparing energy usage by the users 150, 160 before a change in the voltage set point value $V_{SP}$ (or voltage band $V_{Band-n}$) to the energy usage by the users 150, 160 after a change in the voltage set point value $V_{SP}$ (or voltage band $V_{Band-n}$), according to principles of the disclosure. These measurements and validations may be used to determine the effect in overall energy savings by, for example, lowering the voltage $V_{Delivered}(t)$ of the electrical power $E_{Delivered}(t)$ delivered to the users 150, 160, and to determine optimal delivery voltage bands $V_{Band-n}$ for the energy power $E_{Delivered}(t)$ delivered to the users 150, 160.

ER System 500

The ER system 500 may communicate with the ED system 300 and/or EC system 400 by means of the network 170. The ER system 500 is coupled to the network 170 and the EC system 400 by means of communication links 510 and 430, respectively. The EC system 500 is also coupled to the ED system 300 by means of the power lines 340, which may include communication links.

The ER system 500 includes a substation 530 which receives the electrical power supply $E_{In}(t)$ from, for example, the power generating station 110 (shown in FIG. 1) on a line 520. The electrical power $E_{In}(t)$ includes a voltage $V_{In}(t)$ component and a current $I_{In}(t)$ component. The substation 530 adjustably transforms the received electrical power $E_{In}(t)$ to, for example, reduce (or step-down) the voltage component $V_{In}(t)$ of the electrical power $E_{In}(t)$ to a voltage value $V_{Supply}(t)$ of the electrical power $E_{Supply}(t)$ supplied to the plurality of AMIs 330 on the power supply lines 340.

The substation 530 may include a transformer (not shown), such as, for example, a load tap change (LTC) transformer. In this regard, the substation 530 may further include an automatic tap changer mechanism (not shown), which is configured to automatically change the taps on the LTC transformer. The tap changer mechanism may change the taps on the LTC transformer either on-load (on-load tap changer, or OLTC) or off-load, or both. The tap changer mechanism may be motor driven and computer controlled. The substation 530 may also include a buck/boost transformer to adjust and maximize the power factor of the electrical power $E_{Delivered}(t)$ supplied to the users on power supply lines 340.

Additionally (or alternatively), the substation 530 may include one or more voltage regulators, or other voltage controlling equipment, as known by those having ordinary skill in the art, that may be controlled to maintain the output the voltage component $V_{Supply}(t)$ of the electrical power $E_{Supply}(t)$ at a predetermined voltage value or within a predetermined range of voltage values.

The substation 530 receives the energy delivery parameters $C_{ED}$ from the EC system 400 on the communication link 430. The energy delivery parameters $C_{ED}$ may include, for example, load tap coefficients when an LTC transformer is used to step-down the input voltage component $V_{In}(t)$ of the electrical power $E_{In}(t)$ to the voltage component $V_{Supply}(t)$ of the electrical power $E_{Supply}(t)$ supplied to the ED system 300. In this regard, the load tap coefficients may be used by the ER system 500 to keep the voltage component $V_{Supply}(t)$ on the low-voltage side of the LTC transformer at a predetermined voltage value or within a predetermined range of voltage values.

The LTC transformer may include, for example, seventeen or more steps (thirty-five or more available positions), each of which may be selected based on the received load tap coefficients. Each change in step may adjust the voltage component $V_{Supply}(t)$ on the low voltage side of the LTC transformer by as little as, for example, about five-sixteenths (0.3%), or less.

Alternatively, the LTC transformer may include fewer than seventeen steps. Similarly, each change in step of the LTC transformer may adjust the voltage component $V_{Supply}(t)$ on the low voltage side of the LTC transformer by more than, for example, about five-sixteenths (0.3%).

The voltage component $V_{Supply}(t)$ may be measured and monitored on the low voltage side of the LTC transformer by, for example, sampling or continuously measuring the voltage component $V_{Supply}(t)$ of the stepped-down electrical power $E_{Supply}(t)$ and storing the measured voltage component $V_{Supply}(t)$ values as a function of time t in a storage (not shown), such as, for example, a computer readable medium. The voltage component $V_{Supply}(t)$ may be monitored on, for example, a substation distribution bus, or the like. Further, the voltage component $V_{Supply}(t)$ may be measured at any point where measurements could be made for the transmission or distribution systems in the ER system 500.

Similarly, the voltage component $V_{In}(t)$ of the electrical power $E_{In}(t)$ input to the high voltage side of the LTC transformer may be measured and monitored. Further, the current component $I_{Supply}(t)$ of the stepped-down electrical power $E_{Supply}(t)$ and the current component $I_{In}(t)$ of the electrical power $E_{In}(t)$ may also be measured and monitored. In this regard, a phase difference $\varphi_{In}(t)$ between the voltage $V_{In}(t)$ and current $I_{In}(t)$ components of the electrical power $E_{In}(t)$ may be determined and monitored. Similarly, a phase difference $\varphi_{Supply}(t)$ between the voltage $V_{Supply}(t)$ and current $I_{Supply}(t)$ components of the electrical energy supply $E_{Supply}(t)$ may be determined and monitored.

The ER system 500 may provide electrical energy supply status information to the EC system 400 on the communication links 430 or 510. The electrical energy supply information may include the monitored voltage component $V_{Supply}(t)$. The electrical energy supply information may further include the voltage component $V_{In}(t)$, current components $I_{In}(t)$, $I_{Supply}(t)$, and/or phase difference values $\varphi_{In}(t)$, $\varphi_{Supply}(t)$, as a function of time t. The electrical energy supply status information may also include, for example, the load rating of the LTC transformer.

The electrical energy supply status information may be provided to the EC system 400 at periodic intervals of time, such as, for example, every second, 5 sec., 10 sec., 30 sec., 60 sec., 120 sec., 600 sec., or any other value within the scope and spirit of the disclosure, as determined by one having ordinary skill in the art. The periodic intervals of time may be set by the EC system 400 or the ER system 500. Alternatively, the electrical energy supply status information may be provided to the EC system 400 or ER system 500 intermittently.

Further, the electrical energy supply status information may be forwarded to the EC system 400 in response to a request by the EC system 400, or when a predetermined event is detected. The predetermined event may include, for example, when the voltage component $V_{Supply}(t)$ changes by an amount greater (or less) than a defined threshold value $V_{SupplyThreshold}$ (for example, 130V) over a predetermined interval of time, a temperature of one or more components in the ER system 500 exceeds a defined temperature threshold, or the like.

ED System 300

The ED system 300 includes a plurality of AMIs 330. The ED system 300 may further include at least one collector 350, which is optional. The ED system 300 may be coupled to the network 170 by means of a communication link 310. The collector 350 may be coupled to the plurality of AMIs 330 by means of a communication link 320. The AMIs 330 may be coupled to the ER system 500 by means of one or more power supply lines 340, which may also include communication links.

Each AMI 330 is configured to measure, store and report energy usage data by the associated users 150, 160 (shown in FIG. 1). Each AMI 330 is further configured to measure and determine energy usage at the users 150, 160, including the voltage component $V_{Meter}(t)$ and current component $I_{Meter}(t)$ of the electrical power $E_{Meter}(t)$ used by the users 150, 160, as a function of time. The AMIs 330 may measure the voltage component $V_{Meter}(t)$ and current component $I_{Meter}(t)$ of the electrical power $R_{Meter}(t)$ at discrete times $t_s$, where s is a sampling period, such as, for example, s=5 sec., 10 sec., 30 sec., 60 sec., 300 sec., 600 sec., or more. For example, the AMIs 330 may measure energy usage every, for example, minute (160 sec), five minutes (1300 sec), ten minutes (1600 sec), or more, or at time intervals variably set by the AMI 330 (for example, using a random number generator).

The AMIs 330 may average the measured voltage $V_{Meter}(t)$ and/or $I_{Meter}(t)$ values over predetermined time intervals (for example, 5 min., 10 min., 30 min., or more). The AMIs 330 may store the measured electrical power usage $E_{Meter}(t)$, including the measured voltage component $V_{Meter}(t)$ and/or current component $I_{Meter}(t)$ as AMI data in a local (or remote) storage (not shown), such as, for example, a computer readable medium.

Each AMI 330 is also capable of operating in a "report-by-exception" mode for any voltage $V_{Meter}(t)$, current $I_{Meter}(t)$, or energy usage $E_{Meter}(t)$ that falls outside of a target component band. The target component band may include, a target voltage band, a target current band, or a target energy usage band. In the "report-by-exception" mode, the AMI 330 may sua sponte initiate communication and send AMI data to the EC system 400. The "report-by-exception" mode may be used to reconfigure the AMIs 330 used to represent, for example, the lowest voltages on the circuit as required by changing system conditions.

The AMI data may be periodically provided to the collector 350 by means of the communication links 320. Additionally, the AMIs 330 may provide the AMI data in response to a AMI data request signal received from the collector 350 on the communication links 320.

Alternatively (or additionally), the AMI data may be periodically provided directly to the EC system 400 (for example, the MAS 460) from the plurality of AMIs, by means of, for example, communication links 320, 410 and network 170. In this regard, the collector 350 may be bypassed, or eliminated from the ED system 300. Furthermore, the AMIs 330 may provide the AMI data directly to the EC system 400 in response to a AMI data request signal received from the EC system 400. In the absence of the collector 350, the EC system (for example, the MAS 460) may carry out the functionality of the collector 350 described herein.

The request signal may include, for example, a query (or read) signal and a AMI identification signal that identifies the particular AMI 330 from which AMI data is sought. The AMI data may include the following information for each AMI 330, including, for example, kilo-Watt-hours (kWh) delivered data, kWh received data, kWh delivered plus kWh received data, kWh delivered minus kWh received data, voltage level data, current level data, phase angle between voltage and current, kVar data, time interval data, demand data, and the like.

Additionally, the AMIs 330 may send the AMI data to the meter automation system server MAS 460. The AMI data may be sent to the MAS 460 periodically according to a predetermined schedule or upon request from the MAS 460.

The collector 350 is configured to receive the AMI data from each of the plurality of AMIs 330 via the communication links 320. The collector 350 stores the received AMI data in a local storage (not shown), such as, for example, a computer readable medium (e.g., a non-transitory computer readable medium). The collector 350 compiles the received AMI data into a collector data. In this regard, the received AMI data may be aggregated into the collector data based on, for example, a geographic zone in which the AMIs 330 are located, a particular time band (or range) during which the AMI data was collected, a subset of AMIs 330 identified in a collector control signal, and the like. In compiling the received AMI data, the collector 350 may average the voltage component $V_{Meter}(t)$ values received in the AMI data from all (or a subset of all) of the AMIs 330.

The EC system 400 is able to select or alter a subset of all of the AMIs 330 to be monitored for predetermined time intervals, which may include for example 15 minute intervals. It is noted that the predetermined time intervals may be shorter or longer than 15 minutes. The subset of all of the AMIs 330 is selectable and can be altered by the EC system 400 as needed to maintain minimum level control of the voltage $V_{Supply}(t)$ supplied to the AMIs 330.

The collector 350 may also average the electrical power $E_{Meter}(t)$ values received in the AMI data from all (or a subset of all) of the AMIs 330. The compiled collector data may be provided by the collector 350 to the EC system 400 by means of the communication link 310 and network 170. For example, the collector 350 may send the compiled collector data to the MAS 460 (or ROC 490) in the EC system 400.

The collector 350 is configured to receive collector control signals over the network 170 and communication link 310 from the EC system 400. Based on the received collector control signals, the collector 350 is further configured to select particular ones of the plurality of AMIs 330 and query the meters for AMI data by sending a AMI data request signal to the selected AMIs 330. The collector 350 may then collect the AMI data that it receives from the selected AMIs 330 in response to the queries. The selectable AMIs 330 may include any one or more of the plurality of AMIs 330. The collector control signals may include, for example, an identification of the AMIs 330 to be queried (or read), time(s) at which the identified AMIs 330 are to measure the $V_{Meter}(t)$, $I_{Meter}(t)$, $E_{Meter}(t)$ and/or $\varphi_{Meter}(t)$ ($\varphi_{Meter}(t)$ is the phase difference between the voltage $V_{Meter}(t)$ and current $I_{Meter}(t)$ components of the electrical power $E_{Meter}(t)$ measured at the identified AMI 330), energy usage information since the last reading from the identified AMI 330, and the like. The collector 350 may then compile and send the compiled collector data to the MAS 460 (and/or ROC 490) in the EC system 400.

EC System 400

The EC system 400 may communicate with the ED system 300 and/or ER system 500 by means of the network 170. The EC system 400 is coupled to the network 170 by means of one or more communication links 410. The EC system 400 may also communicate directly with the ER system 500 by means of a communication link 430.

The EC system 400 includes the MAS 460, a database (DB) 470, a distribution management system (DMS) 480, and a regional operation center (ROC) 490. The ROC 490 may include a computer (ROC computer) 495, a server (not shown) and a database (not shown). The MAS 460 may be coupled to the DB 470 and DMS 480 by means of communication links 420 and 440, respectively. The DMS 480 may be coupled to the ROC 490 and ER system 500 by means of the communication link 430. The database 470 may be located at the same location as (for example, proximate to, or within) the MAS 460, or at a remote location that may be accessible via, for example, the network 170.

The EC system 400 is configured to de-select, from the subset of monitored AMIs 330, a AMI 330 that the EC system 400 previously selected to monitor, and select the AMI 330 that is outside of the subset of monitored AMIs 330, but which is operating in the report-by-exception mode. The EC system 400 may carry out this change after receiving the sua sponte AMI data from the non-selected AMI 330. In this regard, the EC system 400 may remove or terminate a connection to the de-selected AMI 330 and create a new connection to the newly selected AMI 330 operating in the report-by-exception mode. The EC system 400 is further configured to select any one or more of the plurality of AMIs 330 from which it receives AMI data comprising, for example, the lowest measured voltage component $V_{Meter}(t)$, and generate an energy delivery parameter $C_{ED}$ based on the AMI data received from the AMI(s) 330 that provide the lowest measured voltage component $V_{Meter}(t)$.

The MAS 460 may include a computer (not shown) that is configured to receive the collector data from the collector 350, which includes AMI data collected from a selected subset (or all) of the AMIs 330. The MAS 460 is further configured to retrieve and forward AMI data to the ROC 490 in response to queries received from the ROC 490. The MAS 460 may store the collector data, including AMI data in a local storage and/or in the DB 470.

The DMS 480 may include a computer that is configured to receive the electrical energy supply status information from the substation 530. The DMS 480 is further configured to retrieve and forward measured voltage component $V_{Meter}(t)$ values and electrical power $E_{Meter}(t)$ values in response to queries received from the ROC 490. The DMS 480 may be further configured to retrieve and forward measured current component $I_{Meter}(t)$ values in response to queries received from the ROC 490. The DMS 480 also may be further configured to retrieve all "report-by-exception" voltages $V_{Meter}(t)$ from the AMIs 330 operating in the "report-by-exception" mode and designate the voltages $V_{Meter}(t)$ as one of the control points to be continuously read at predetermined times (for example, every 15 minutes, or less (or more), or at varying times). The "report-by-exception voltages $V_{Meter}(t)$ may be used to control the EC 500 set points.

The DB 470 may include a plurality of relational databases (not shown). The DB 470 includes a large number of records that include historical data for each AMI 330, each collector 350, each substation 530, and the geographic area(s) (including latitude, longitude, and altitude) where the AMIs 330, collectors 350, and substations 530 are located.

For instance, the DB 470 may include any one or more of the following information for each AMI 330, including: a geographic location (including latitude, longitude, and altitude); a AMI identification number; an account number; an account name; a billing address; a telephone number; a AMI type, including model and serial number; a date when the AMI was first placed into use; a time stamp of when the AMI was last read (or queried); the AMI data received at the time of the last reading; a schedule of when the AMI is to be read (or queried), including the types of information that are to be read; and the like.

The historical AMI data may include, for example, the electrical power $E_{Meter}(t)$ used by the particular AMI 330, as a function of time. Time t may be measured in, for example, discrete intervals at which the electrical power $E_{Meter}$ magnitude (kWh) of the received electrical power $E_{Meter}(t)$ is measured or determined at the AMI 330. The historical AMI data includes a measured voltage component $V_{Meter}(t)$ of the electrical energy $E_{Meter}(t)$ received at the AMI 330. The historical AMI data may further include a measured current component $I_{Meter}(t)$ and/or phase difference $\varphi_{Meter}(t)$ of the electrical power $E_{Meter}(t)$ received at the AMI 330.

As noted earlier, the voltage component $V_{Meter}(t)$ may be measured at a sampling period of, for example, every five seconds, ten seconds, thirty seconds, one minute, five minutes, ten minutes, fifteen minutes, or the like. The current component $I_{Meter}(t)$ and/or the received electrical power $E_{Meter}(t)$ values may also be measured at substantially the same times as the voltage component $V_{Meter}(t)$.

Given the low cost of memory, the DB 470 may include historical data from the very beginning of when the AMI data was first collected from the AMIs 330 through to the most recent AMI data received from the AMIs 330.

The DB 470 may include a time value associated with each measured voltage component $V_{Meter}(t)$, current component $I_{Meter}(t)$, phase component $\varphi_{Meter}(t)$ and/or electrical power $E_{Meter}(t)$, which may include a timestamp value generated at the AMI 330. The timestamp value may include, for example, a year, a month, a day, an hour, a minute, a second, and a fraction of a second. Alternatively, the timestamp may be a coded value which may be decoded to determine a year, a month, a day, an hour, a minute, a second, and a fraction of a second, using, for example, a look up table. The ROC 490 and/or AMIs 330 may be configured to receive, for example, a WWVB atomic clock signal transmitted by the U.S. National Institute of Standards and Technology (NIST), or the like and synchronize its internal clock (not shown) to the WWVB atomic clock signal.

The historical data in the DB 470 may further include historical collector data associated with each collector 350. The historical collector data may include any one or more of the following information, including, for example: the particular AMIs 330 associated with each collector 350; the geographic location (including latitude, longitude, and altitude) of each collector 350; a collector type, including model and serial number; a date when the collector 350 was first placed into use; a time stamp of when collector data was last received from the collector 350; the collector data that was received; a schedule of when the collector 350 is expected to send collector data, including the types of information that are to be sent; and the like.

The historical collector data may further include, for example, an external temperature value $T_{Collector}(t)$ measured outside of each collector 350 at time t. The historical collector data may further include, for example, any one or more of the following for each collector 350: an atmospheric pressure value $P_{collector}(t)$ measured proximate the collector 350 at time t; a humidity value $H_{collector}(t)$ measured proximate the collector 350 at time t; a wind vector value $W_{Collector}(t)$ measured proximate the collector 350 at time t, including direction and magnitude of the measured wind; a solar irradiant value $L_{Collector}(t)$ (kW/m$^2$) measured proximate the collector 350 at time t; and the like.

The historical data in the DB 470 may further include historical substation data associated with each substation 530. The historical substation data may include any one or more of the following information, including, for example: the identifications of the particular AMIs 330 supplied with electrical energy $E_{Supply}(t)$ by the substation 530; the geographic location (including latitude, longitude, and altitude) of the substation 530; the number of distribution circuits; the number of transformers; a transformer type of each transformer, including model, serial number and maximum Megavolt Ampere (MVA) rating; the number of voltage regulators; a voltage regulator type of each voltage regulator, including model and serial number; a time stamp of when substation data was last received from the substation 530; the substation data that was received; a schedule of when the substation 530 is expected to provide electrical energy supply status information, including the types of information that are to be provided; and the like.

The historical substation data may include, for example, the electrical power $E_{Supply}(t)$ supplied to each particular AMI 330, where $E_{Supply}(t)$ is measured or determined at the output of the substation 530. The historical substation data includes a measured voltage component $V_{Supply}(t)$ of the supplied electrical power $E_{Supply}(t)$, which may be measured, for example, on the distribution bus (not shown) from the transformer. The historical substation data may further include a measured current component $I_{Supply}(t)$ of the supplied electrical power $E_{Supply}(t)$. As noted earlier, the voltage component $V_{Supply}(t)$, the current component $I_{Supply}(t)$, and/or the electrical power $E_{Supply}(t)$ may be measured at a sampling period of, for example, every five seconds, ten seconds, thirty seconds, a minute, five minutes, ten minutes, or the like. The historical substation data may further include a phase difference value $\varphi_{Supply}(t)$ between the voltage $V_{Supply}(t)$ and current $I_{Supply}(t)$ signals of the electrical power $E_{Supply}(t)$, which may be used to determine the power factor of the electrical power $E_{Supply}(t)$ supplied to the AMIs 330.

The historical substation data may further include, for example, the electrical power $E_{In}(t)$ received on the line 520 at the input of the substation 530, where the electrical power $E_{In}(t)$ is measured or determined at the input of the substation 530. The historical substation data may include a measured voltage component $V_{In}(t)$ of the received electrical power $E_{In}(t)$, which may be measured, for example, at the input of the transformer. The historical substation data may further include a measured current component WO of the received electrical power $E_{In}(t)$. As noted earlier, the voltage component $V_{In}(t)$, the current component $I_{In}(t)$, and/or the electrical power $E_{In}(t)$ may be measured at a sampling period of, for example, every five seconds, ten seconds, thirty seconds, a minute, five minutes, ten minutes, or the like. The historical substation data may further include a phase difference $\varphi_{In}(t)$ between the voltage component $V_{In}(t)$ and current component $I_{In}(t)$ of the electrical power $E_{In}(t)$. The power factor of the electrical power $E_{In}(t)$ may be determined based on the phase difference $\varphi_{In}(t)$.

According to an aspect of the disclosure, the EC system 400 may save aggregated kW data at the substation level, voltage data at the substation level, and weather data to compare to energy usage per AMI 330 to determine the energy savings from the VCC system 200, and using linear regression to remove the effects of weather, load growth, economic effects, and the like, from the calculation.

In the VCC system 200, control may be initiated from, for example, the ROC computer 495. In this regard, a control screen 305 may be displayed on the ROC computer 495, as shown, for example, in FIG. 3 of the US 2013/0030591 publication. The control screen 305 may correspond to data for a particular substation 530 (for example, the TRABUE SUBSTATION) in the ER system 500. The ROC computer 495 can control and override (if necessary), for example, the substation 530 load tap changing transformer based on, for example, the AMI data received from the ED system 300 for the users 150, 160. The ED system 300 may determine the voltages of the electrical power supplied to the user locations 150, 160, at predetermined (or variable) intervals, such as, e.g., on average each 15 minutes, while maintaining the voltages within required voltage limits.

For system security, the substation 530 may be controlled through the direct communication link 430 from the ROC 490 and/or DMS 480, including transmission of data through communication link 430 to and from the ER 500, EUS 300 and EVP 600.

Furthermore, an operator can initiate a voltage control program on the ROC computer 490, overriding the controls, if necessary, and monitoring a time it takes to read the user voltages $V_{Meter}(t)$ being used for control of, for example, the substation LTC transformer (not shown) in the ER system 500.

EVP System 600

FIG. 2 of the '085 application shows the energy validation process 600 for determining the amount of conservation in energy per customer realized by operating the VCC system in FIGS. 1-2 of the present application. The process is started 601 and the data the ON and OFF periods is loaded 602 by the process manager. The next step is to collect 603 the hourly voltage and power (MW) data from the metering data points on the VCC system from the DMS 480 which may be part of a supervisory control and data acquisition (SCADA) type of industrial control system. Next the corresponding weather data is collected 604 for the same hourly conditions. The data is processed 605, 606, 607, 608 to improve its quality using filters and analysis techniques to eliminate outliers that could incorrectly affect the results, as describe further below. If hourly pairing is to be done the hourly groups are determined 609 using the linear regression techniques. The next major step is to determine 611, 612, 613, 614, 615, 616, 617 the optimal pairing of the samples, as described further below.

EPP System 1700

FIG. 2 of the present application also shows an example of the EPP system 1700 applied to a distribution circuit, that also may include the VCC system 200 and the EVP system 600, as discussed previously. The EPP system 1700 collects the historic energy and voltage data from the AMI system from database 470 and/or the distribution management systems (DMS) 480 and combines this with the CVR factor analysis from the EVP system 600 (discussed in detail in the '085 application) to produce an optimized robust planning process for correcting problems and improving the capability of the VCC system 200 to increase the energy efficiency and demand reduction applications.

HVL System 1800

FIG. 2 shows an example of the high variation loading (HVL) system 1800 applied to a distribution circuit with EPP 1700, VCC 200 and EVP 600 systems operating as well. The HVL system 1800 collects the report-by-exception data (described in US publication 2013/0030591) and compares the levels with the HVL block monitored meters to identify any patterns related to high variation load activity. The HVL system 1800 also uses energy and voltage data from the AMI system and the distribution management systems (DMS) 480 and combines this with the piecewise linear regression model for the HVL voltages in order to constantly evaluate whether the VCC system 200 should change from operating in an energy efficiency mode to operating in an HVL mode. If the appropriate patterns (related to high variation load activity) are recognized, the HVL optimization model solution is implemented based on the configuration information from the EPP system 1700 to produce an optimized robust process for maximizing the capability of the VCC system 200 to accept HVL events.

Figure 3:
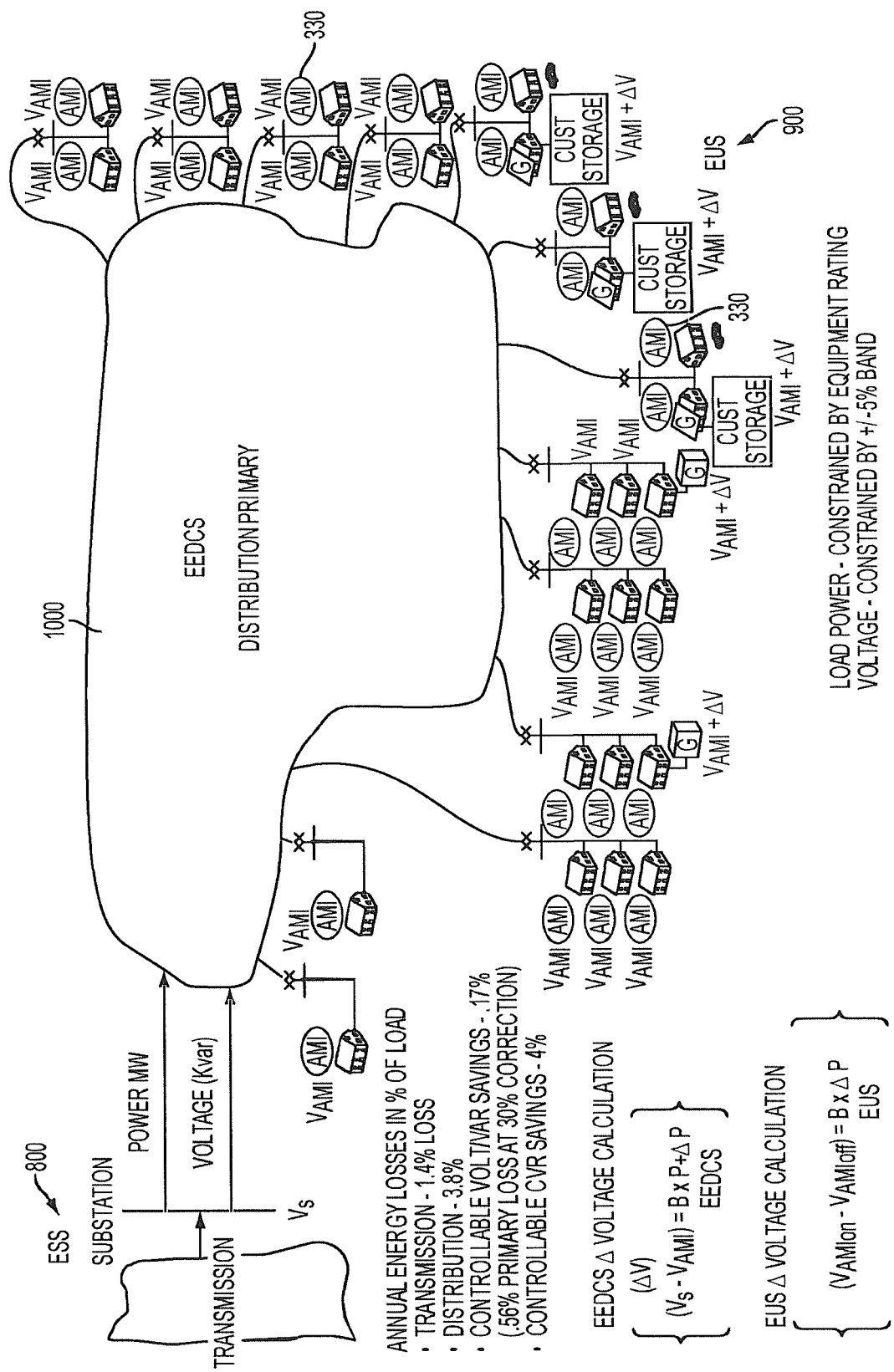
FIG. 3 shows an example of how the EEDCS is represented as a linear model for the calculation of the delivery voltages and the energy losses by just using a linear model with assumptions within the limitations of the output voltages, according to principles of the disclosure.

FIG. 3 shows an example of how the EEDCS 1000 is represented as a linear model for the calculation of the delivery voltages and the energy losses by just using a linear model with assumptions within the limitations of the output voltages. This model enables a robust model that can implement an optimization process and is more accommodating to a secondary voltage measuring system (e.g., AMI-based measurements). The two linear approximations for the power losses associated with the voltage drops from the ESS 800 to the EUS 900 are shown in FIG. 3 and make up the mathematical model for the performance criterion over limited model range of the voltage constraints of the EUS AMI voltages. The relative loss amounts between the primary and secondary EEDCS to the CVR factor based losses of the EUS to EDS are also shown as being less than 5% and more than 95%. This near order of magnitude difference allows more assumptions to be used in deriving the smaller magnitude of the EEDCS losses and the more accurate model for calculating the larger CVR factor losses of the EUS to ED. In addition the HVL system 1800 is constantly evaluating the report-by-exceptions to identify HVL patterns that would initiate the HVL optimization process maximizing the capability of the EEDS 700 to accommodate HVL events.

Figure 4:
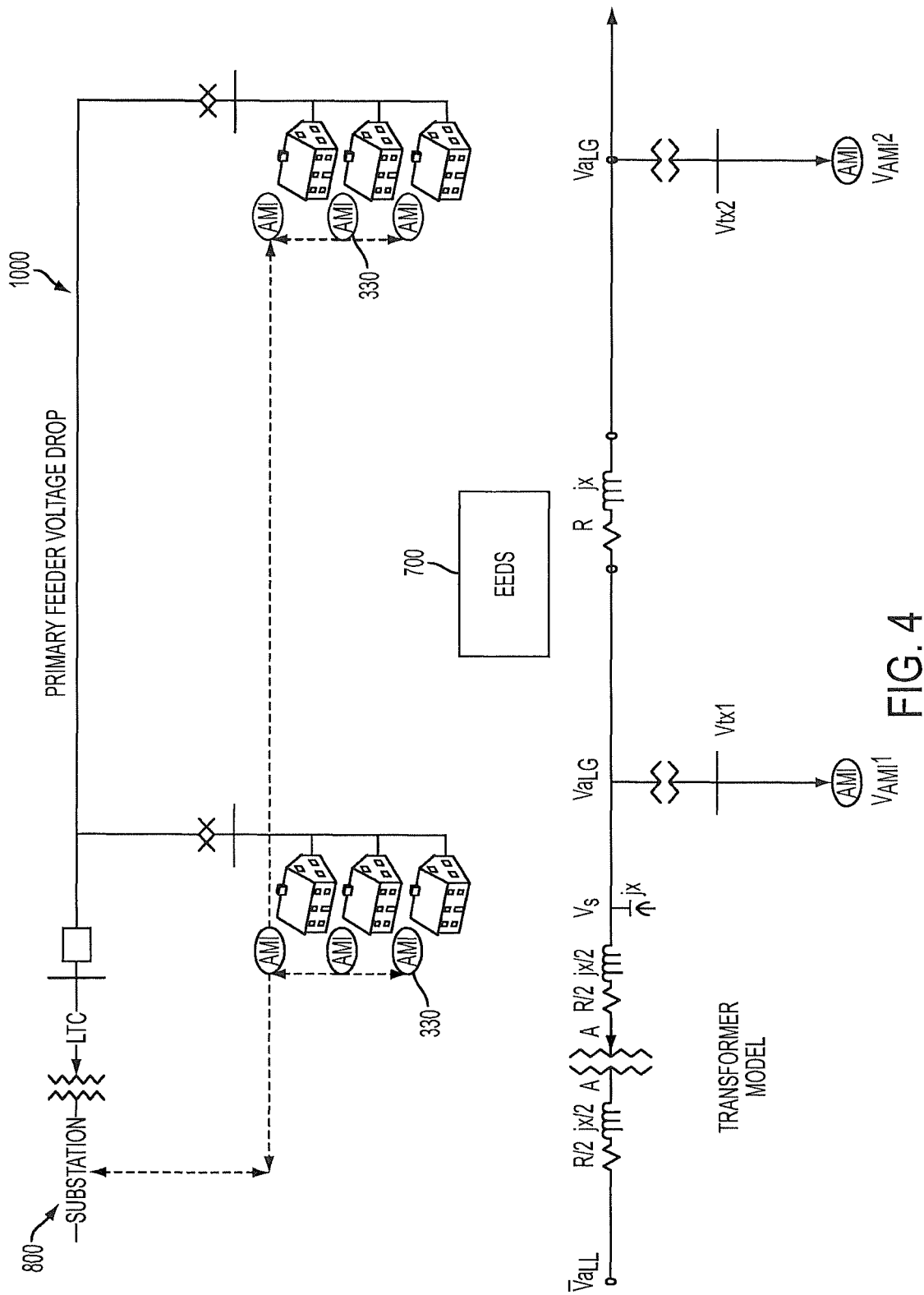
FIG. 4 shows the method of building a primary model using the GIS information along with the AMI metering data, according to principles of the disclosure.

FIG. 4 shows the method of building a primary model using the GIS information along with the AMI metering data. The first step is to reflect all voltages to the 120 volt base and correlate voltages starting at the substation. The GIS map coordinates are used to map distances from the substation general load centers and the voltage drop is done, for example, for 30 hours of AMI and substation load data using the primary conductor impedance. Then the AMI voltages are first correlated at the secondary transformer level using the GPS data to estimate customer conductor distances and converting those to impedances using typical service conductors. Then, at the transformer, correlated loads are aggregated and used with typical service transformer impedances to estimate the primary voltages. This process is repeated for all loads within a given GPS distance. The statistical average of the 30 samples (one sample per hour of data) is used to produce a distribution of voltages at the primary level and the average value of the calculation used as the primary voltage connection point. Repeated service transformer voltages are correlated to determine where on each circuit they are most likely connected. The impedance is used to approximate the next voltage drop point where load should be attached. The voltage drop is calculated and the appropriate loads are connected to that point on the approximate one line. Then a known method of identifying phase and circuit is used with the correlated loads to eliminate connection errors. Finally, the list is compared to the existing DMS and planning models to eliminate errors in the GPS data. With this information, the percent voltage splits from primary to secondary can be more accurately determined and the voltage characteristics of the high variability loads represented accurately on the primary and secondary models. Then the model in FIG. 4 is extended to the next impedance point and the voltage correlation continues.

Figure 5:
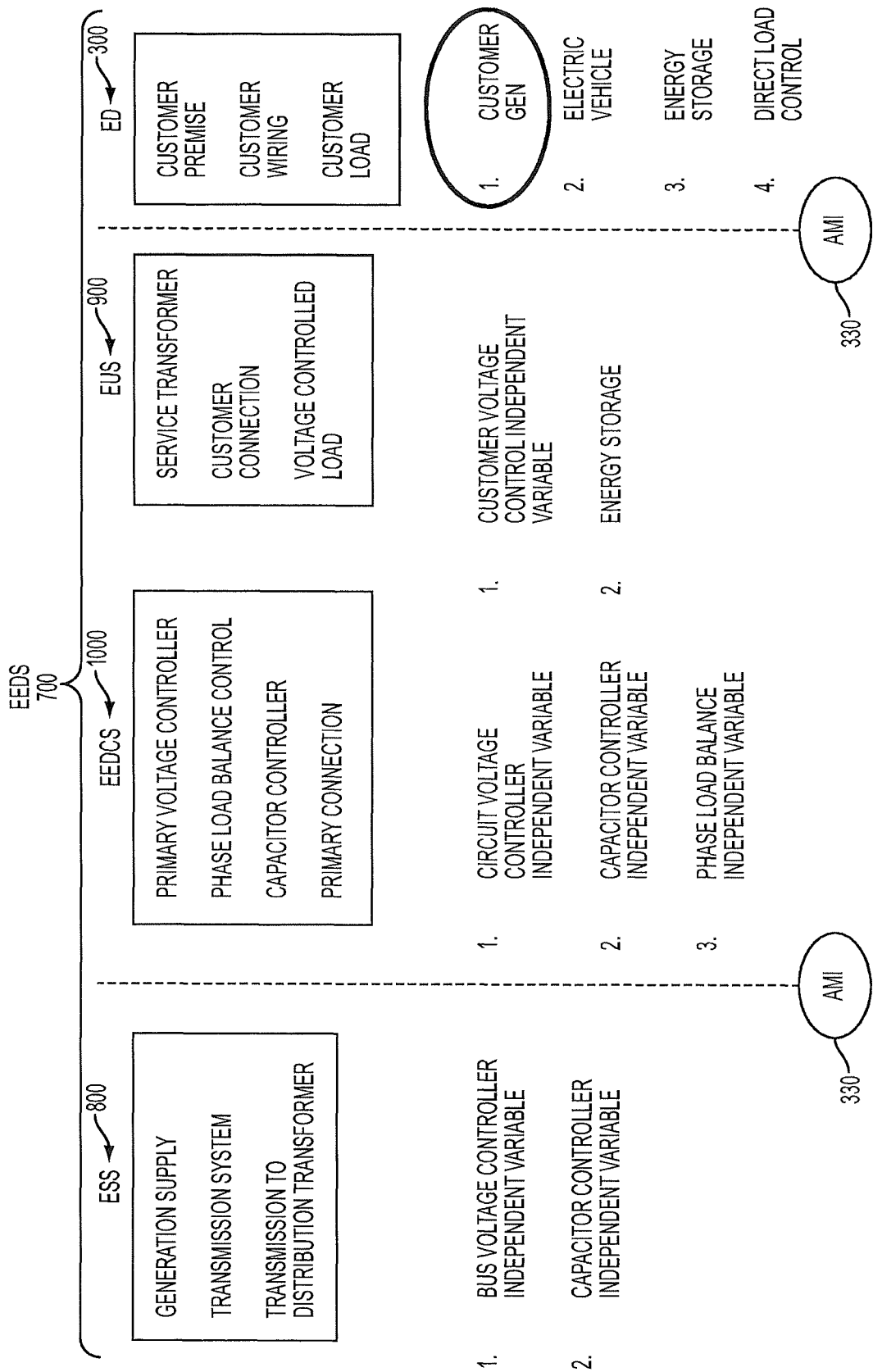
FIG. 5 shows an example of a EEDS structure for an electric distribution system with measuring points at the ESS delivery points and the EUS metering points, showing the equipment and devices within the system and the independent variables that can be used to accomplish the optimization of the EEDS, according to principles of the disclosure.
Figure 6A:
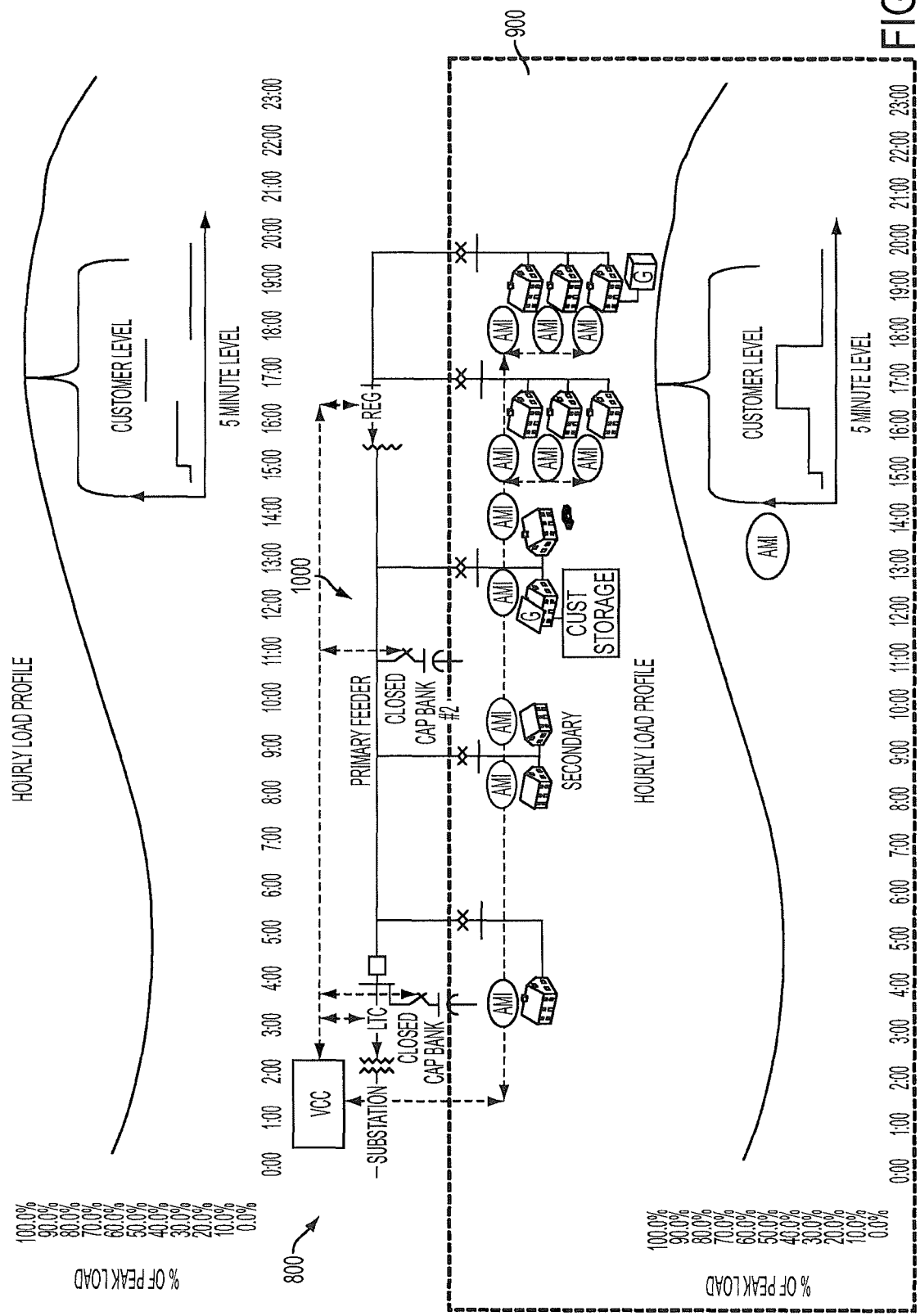
FIGS. 6A and 6B show an example of the measuring system for the AMI meters used in the VCC, according to principles of the disclosure.
Figure 6B:
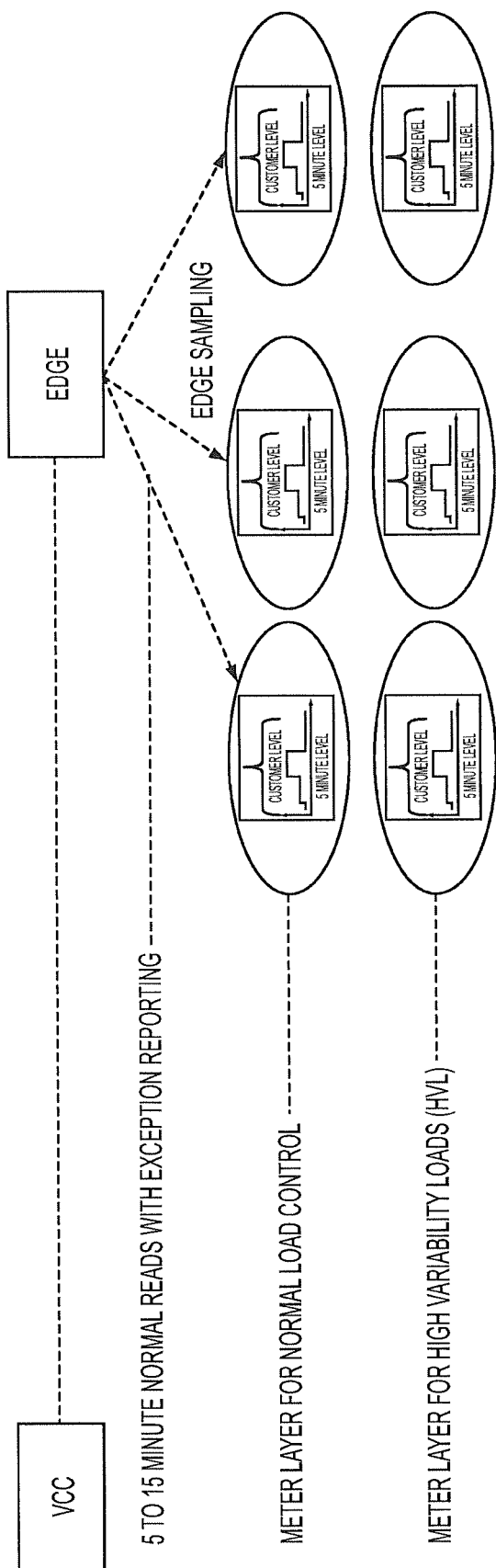

FIG. 5 shows an example of an EEDS control structure for an electric distribution system with measuring points at the ESS delivery points and the EUS metering points. The control points are the independent variables in the optimization model that will be used to determine the optimum solution to the minimization of the power losses and the control of the optimum compatibility for HVL in the EEDS 700. The blocks at the top of the FIG. 5 illustrate the components of the various systems of the EEDS 700, e.g., ESS 800, EEDCS 1000, EUS 900 and ED system 300, where the controls or independent variables are located. Below each box include examples of the independent variables that can be used to accomplish the optimization of the EEDS 700. For example, the independent variables to be used in the optimization may include the LTC transformer output voltages, the regulator output voltages, the position of the capacitor banks, the voltage level of the distributed generation, customer voltage control devices or inverter output settings, the inverters for electrical vehicle charging, direct load control devices that affect voltage. The AMI meters 330 are placed at points where the independent variables and the output voltages to the EUS 900 can be measured by the VCC 200. These same independent variables are used to control the maximum level of HVL capability using the piecewise linear optimization. The optimum point is the middle of the linear optimization with the minimization of the block slopes FIGS. 6A and 6B show an example of the measuring system for the AMI meters 330 used in the VCC 200. The key characteristic is that the meters 330 sample the constantly changing levels of voltage at the EUS 900 delivery points and produce the data points that can be compared to the linear model of the load characteristics. This process is used to provide the 5-15 minute sampling that provides the basis to search the boundary conditions of the EEDS 700 to locate the optimum point (discussed in more detail below with reference to FIGS. 9-10 and Tables 1-5). The independent variables are measured to determine the inputs to the linear model for producing an expected state of the output voltages to the EUS 900 for use in modeling the optimization and determining the solution to the optimization problems. The second layer is for the detection and the optimization control for the HVL system 1800. The VCC system 200 can switch between energy efficiency mode (normal load control) and HVL mode as needed to assure reliability by recognizing the stored patterns.

Figure 7:
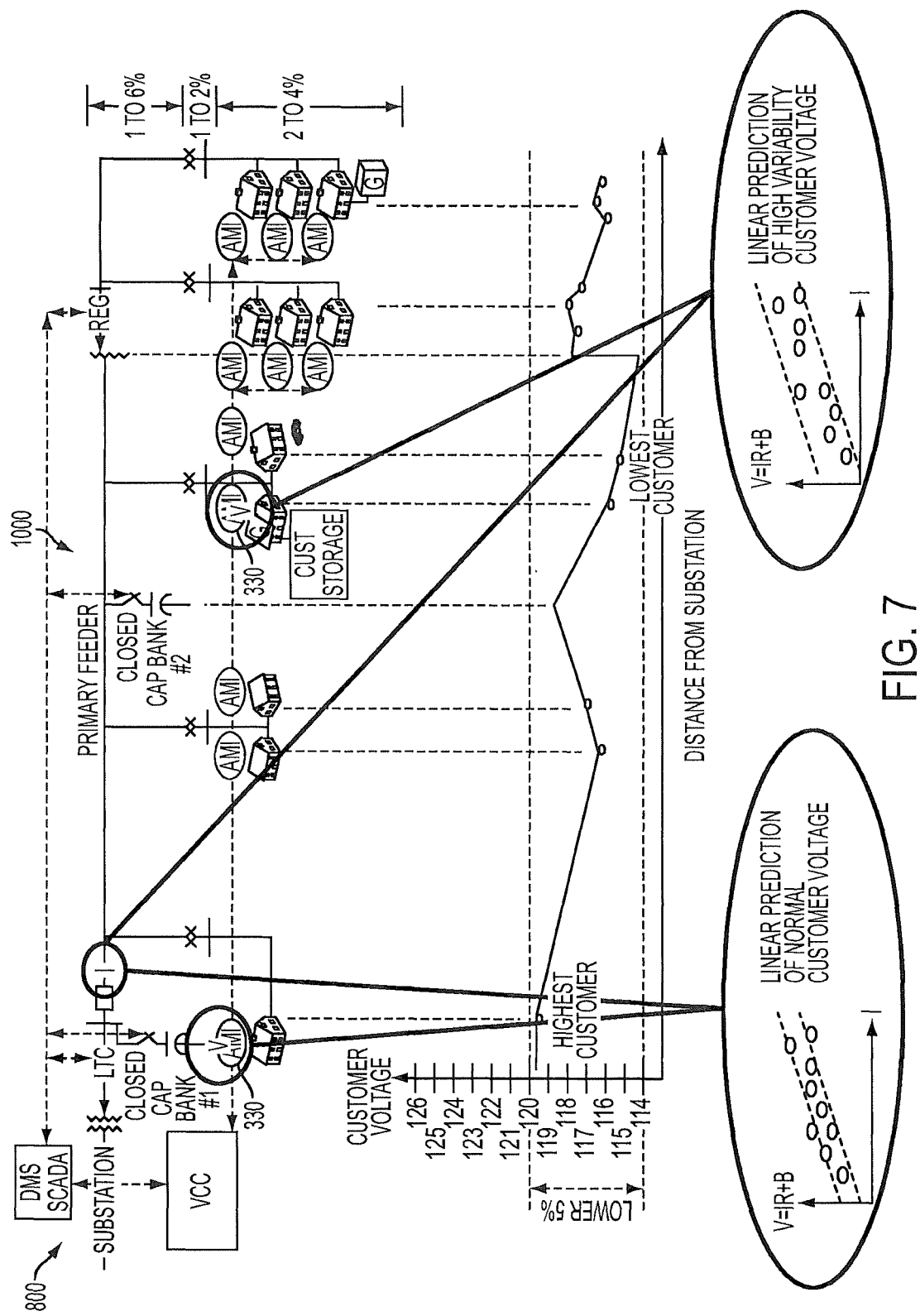
FIG. 7 shows an example of the linear regression analysis relating the control variables to the EUS voltages that determine the power loss, maximum variability capability, voltage level and provide the input for searching for the optimum condition and recognizing the abnormal voltage levels from the AMI voltage metering and change modes of operation between high capability and efficiency, according to principles of the disclosure.

FIG. 7 shows an example of the dual linear regression analysis relating the control variables to the EUS voltages that determine the power loss, voltage level and provide the input for searching for the optimum condition and recognizing the abnormal voltage levels from the AMI voltage metering and the HVL pattern conditions. The specifics of this linear regression analysis based on the AMI voltage metering are discussed in more detail in are described in co-pending patent application No. 61/794,623, entitled ELECTRIC POWER SYSTEM CONTROL WITH PLANNING OF ENERGY DEMAND AND ENERGY EFFICIENCY USING AMI-BASED DATA ANALYSIS, filed on Mar. 15, 2013 ("the '623 application"), the entirety of which is incorporated herein.

Figure 8:
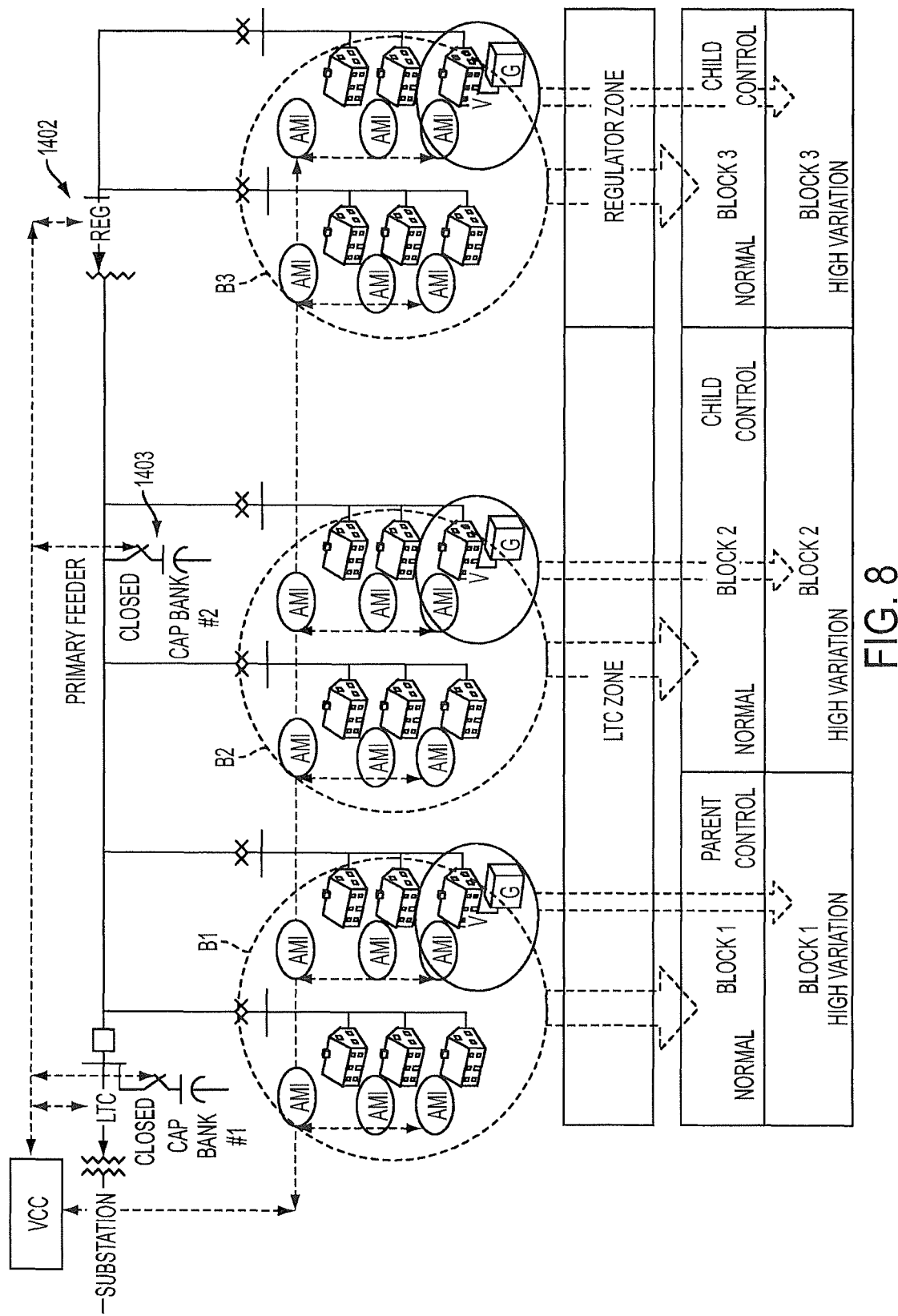
FIG. 8 shows an example of the mapping of control meters to zones of control and blocks of control, according to principles of the disclosure.

FIG. 8 shows an example of the mapping of control meters to zones of control and blocks of control for both the energy efficiency and demand control as well as the block of control for the HVL operation. Each "zone" refers to all AMIs 330 downstream of a regulator and upstream of the next regulator (e.g., LTC, regulator) and each "block" refers to areas within the sphere of influence of features of the distribution system (e.g., a specific capacitor or a specific inverter). In the example shown in FIG. 8, the LTC Zone includes all AMIs 330 downstream of the LTC and upstream of regulator 1402 (e.g., the AMIs 330 in B1 and B2), the Regulator Zone includes all AMIs 330 downstream of regulator 1402 (e.g., the AMIs 300 in B3), and Block 2 (B2) includes all AMIs 330 within the influence (upstream or downstream) of capacitor 1403. Each block includes a specific set of meters 330 for monitoring. The particular meters 330 that are monitored may be determined by the adaptive process within the VCC 200 (as described in US publication 2013/0030591) with respective AMI meter populations. As also seen in FIG. 8, normal or high variation control can be assigned to each block separately.

Figure 9:
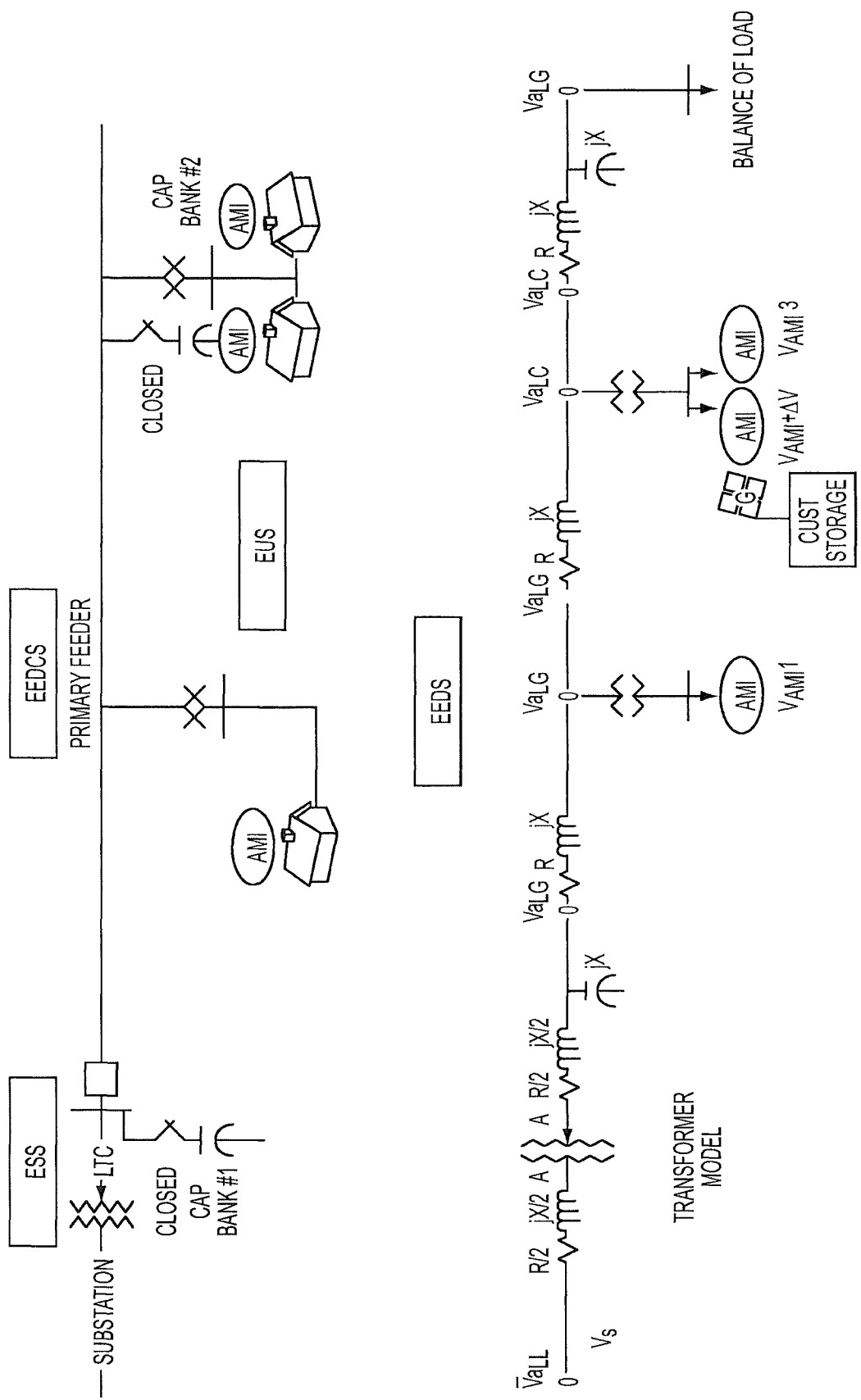
FIG. 9 shows an example of how the voltage characteristics from the independent variables are mapped to the linear regression models of the bellwether meters and to the piecewise linear model of the high variability load monitored meters, according to principles of the disclosure.

FIG. 9 shows an example of how the voltage characteristics from the independent variables are mapped to the linear regression models of the monitored meters 330. The primary loadflow model is used to determine how the general characteristics of the LTC transformer, regulator, capacitor bank, distributed generation and other voltage control independent variables affect the linear regression model. This change is initiated and used to determine the decision point for operating the independent variable so that the optimization process can be implemented to determine the new limiting point from the boundary conditions. The model uses the conversion of the electrical model to a perunit calculation that is then converted to a set of models with nominal voltages of 120 volts. This is then used to translate to the VCC process for implementing the linear regression models for both the ESS to EUS voltage control and the calculation of the EEDS losses. The modeling process is described in further detail with respect to FIG. 6 of the '623 application.

Figure 10:
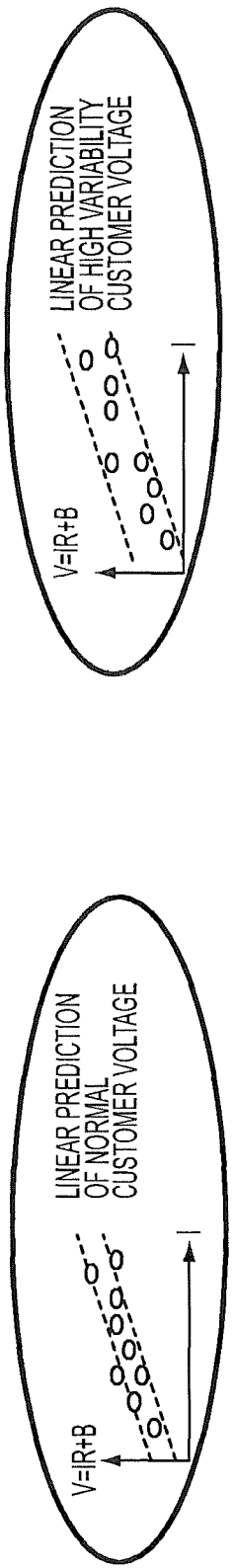
FIG. 10 shows the model used for the implementation of the optimization solution for the VCC, including the linearization for the EEDCS and the linearization of the two loss calculations, according to the principles of the disclosure.

Tables 1-5 and FIG. 10 show the implementation of the optimization control for the VCC 200. Table 1 shows the definition of the boundary conditions for defining the optimization problem and solution process for the VCC 200. Table 1 also describes the boundaries where the model does not apply, for example, the model does not represent the loading of the equipment within the EEDS 700. This modeling is done, instead by more detailed loadflow models for the primary system of the EEDS 700 and is accomplished in the more traditional distribution management systems (DMS) not covered by this disclosure. The present voltage control process is a voltage loss control process that can be plugged into the DMS 480 controls and a HVL process for switching between the loss optimization mode and the HVL process mode, both using the VCC 200 process described in FIG. 2.

TABLE 1

The Voltage Optimization Problem
Problem Boundaries: EEDS System

Specifically the boundary is around control of two characteristics
Power flow from the ESS to the EUS
Power flow from the EUS to the EDS with CVR
The control of the secondary or EUS delivery voltages
The loading of the equipment is outside of the problem boundaries Table 2 shows the performance criterion (e.g., the values to be optimized) and the independent variables (e.g., the values that are varied to gain the optimized solution) of the optimization problem for the VCC 200. The performance criterion is represented by the linear loss models for the EEDCS primary and secondary as well as the CVR factor linear model of the EUS to ED and the piecewise linear method for the HVL mode operation. The use of these linear models in the optimization allows a simple method of calculating the losses within the constraints of the EUS voltages. It also takes advantage of the order of magnitude difference between the two types of losses (as described above with respect to FIG. 3) to make a practical calculation of the performance criterion for the optimization problem as well as doing pattern recognition from the report-by-exception data to control the HVL events using the piecewise linear model.

TABLE 2

The Voltage Optimization Problem

The Performance Criterion: EEDS Load Variation

Power flow losses from the ESS to the EUS
Power flow from the EUS to the EDS from CVR from a high variability
load or generation
Voltage operation for loss of aggregated distributed generation
The losses in the EDS beyond CVR from loading of the equipment are
not
included
The Independent Variables:

LTC Control Voltage setpoints
Capacitor Bank Voltage and/or Var setpoints
Line Regulator Voltage setpoints
EUS Voltage Control
EDS level Voltage Control FIG. 10 shows the summary model used for the implementation of the optimization solution for the VCC 200 including the linearization for the EEDCS 1000 and the linearization of the two loss calculations as well as the linearization model 1750 of the control variables to the output EUS voltages in the bellwether group as well as the general EUS voltage population. FIG. 10 also shows the summary model for the HVL model for optimizing the system's ability to accommodate the HVL events. These models allow a direct solution to the optimization to be made using linear optimization theory.

Table 3 shows the operational constraints of the EUS voltages and the specific assumptions and calculations needed to complete the derivation of the optimization solution that determines the process used by the VCC 200 to implement the optimization search for the optimum point on the boundary conditions determined by the constraints by the EUS voltages and the ability to center the piecewise linear optimum solution when a HVL event has been detected by the HVL pattern recognition. The assumptions are critical to understanding the novel implementation of the VCC control 200 process. The per unit calculation process develops the model basis where the primary and secondary models of the EEDCS 1000 can be derived and translated to a linear process for the determination of the control solution and give the VCC 200 its ability to output voltages at one normalized level for clear comparison of the system state during the optimization solution. The assumption of uniform block loading is critical to derive the constant decreasing nature of the voltage control independent variables and the slope variable from the capacitor bank switching. Putting these assumptions together allows the solution to the optimization problem to be determined. The solution is a routine that searches the boundary conditions of the optimization and searches the piecewise linear model for the HVL optimization, specifically the constraint levels for the EUS to ED voltages to locate the boundary solution to the linear optimization per linear optimization theory.

TABLE 3

The Voltage Optimization Problem

The System Model

Subject to constraints:
$V_{AMI} < +5\%$ of Nominal
$V_{AMI} < -5\%$ of Nominal

TABLE 3-continued

The Voltage Optimization Problem

The Optimum is at a point where maximum power loss or gain can be tolerated and the voltages will remain within constraints The Per Unit Calculation
Uniform Load Assumption
Calculation of voltage shift from power change
Decreasing power change decreases voltage change
Decreasing voltage slope increases voltage change capability
Maximizing the simulations solution of Linear Regression Table 4 shows the general form of the solution to the optimization problem with the assumptions made in Table 3. The results show that the VCC 200 process must search the boundary conditions to find the lowest voltages in each block and used the minimization of the slope of the average block voltages to search the level of independent variables to find the optimal point of voltage operation where the block voltages and block voltage slopes are minimized locating the solution to the optimization problem where the EEDCS 1000 and the EUS 900 to ED 300 losses are minimized satisfying the minimization of the performance criterion by linear optimization theory. For the HVL event, the report-by-exception data is searched to identify patterns that detect a HVL event and allow the VCC to switch from efficiency mode to high reliability mode.

TABLE 4

The Voltage Optimization Problem

The Optimization Specification

Performance Criterion: Minimize Loss
EEDCS and CVR factor EUS to EDS
The EEDS Model Equations: Linear Voltage Relationships Vs − Vami = A + BIami (This is a matrix equation)
I is ESS current levels
Vs is the ESS source voltages
Vami is the EUS to EDS output voltages in matrix form
A and B are piece wise linear regression constants for the equivalent block
Design block capacitance to minimize A and B
Constraints: −5% < Vami < +5%

The block voltage linearization solution
Independent capacitor variables solved to minimize A and B
Block voltage slope minimization
Center voltage controls on average band for the combined linear regression for each current step Table 5 is similar to Table 4, with an added practical solution step to the VCC optimization of using the process of boundary searching to output the setpoint change to the independent control variables with a bandwidth that matches the optimization solution, allowing the control to precisely move the EEDS 700 to the optimum point of operation. This also allows the VCC process 200 to have a local failsafe process in case the centralized control loses its connection to the local devices. If this occurs the local setpoint stays on the last setpoint and minimizes the failure affect until the control path can be re-established.

TABLE 5

Controlling Voltage Optimization

The Optimization Specification

Performance Criterion: Maximize the EEDS combined linearization on primary and on secondary
The EEDS Model Equations: Linear Voltage Relationships Vs − Vami = A + BIami (This is a matrix equation)
I is ESS current levels
Vs is the ESS source voltages
Vami is the EUS to EDS output voltages in matrix form
A and B are piece wise linear regression constants for the equivalent block
Constraints: −5% < Vami < +5%

The Boundary Condition solution
Voltage Centered in combined regression bands
Slope Minimization
Setpoint control with variables step by step bandwidths As discussed above, distributed generation (generally referred to herein and in the drawings by reference character G) can include the use of photovoltaics, distributed storage (generally referred to herein and in the drawings as CUST STORAGE), such as batteries or other storage devices, and their associated equipment, including inverters, such as utility-scale and small-scale commercial or domestic inverters.

In one example smart inverters (SI) can be configured to stabilize steady-state voltage on distribution systems with high distributed energy resource (DER) penetration. SI control may vary based on size, ownership, and communication capabilities. Inverters can include, for example, utility-scale and small-scale commercial or domestic inverters. As residential/commercial small-scale inverters become more numerous, it will have a significant impact on grid operations. Thus in one configuration, inverter output can be configured to stabilize or alter voltage or other electrical power components on the EEDS.

Figure 11:
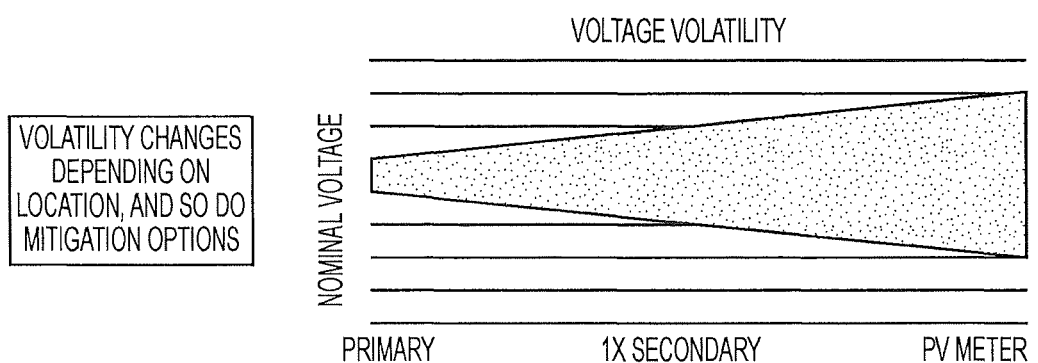
FIG. 11 shows a diagram depicting volatility and strategy with respect to tool, according to principles of the disclosure.

As discussed above, voltage stability is a multi-level concern with multiple mitigation options and multiple independent voltage controls. As shown in FIG. 11, Distribution Primary Voltage is less volatile than transformer secondaries or service points and has different voltage control solutions. Primary voltage control can be achieved through traditional LTC and capacitor bank controls, or through utilization of utility-scale inverters. Local voltage stability is more likely to be controlled by low-voltage regulation devices or small-scale inverters.

In one example, inverters can include Smart Inverters (SI), which have configurable output settings and/or can communicate with the VCC. Inverter output settings can include any controllable component of electrical power based on inverter design, including, but not limited to, power factor, Var, wattage, voltage, current, or communicated ride-through settings, etc.

In one example, AMI sensors, for example meters and/or inverters are configured to communicate through the network 170 to allow for a voltage and Var optimization (VVO) solution that is aware of any stability issues that arise with significant penetrations of DER. The non-monitored meters in the EEDS provide electric power component data, for example taken every 15 minutes over a 24 hour period, for inclusion in load profiles. The data from the monitored meters may also be used in the load profiles. The VCC stabilizer function can integrate the data from the AMI devices and load profiles to assess the state of the grid and initiate appropriate voltage control actions to hedge against predictable voltage risks. The stabilizer function can be applied, for example, once per day or other period.

The VCC can integrate voltage data from AMI meters and assess the state of the grid and initiate appropriate voltage control actions to hedge against predictable voltage risks.

In one example embodiment, primary voltage stability control will be achieved through existing voltage control devices and control of utility-scale inverters. These large-scale voltage control devices will allow for frequent communications with the VCC to regularly update its target settings based on grid conditions. In one example, frequent communications is about every 15 minutes.

Figure 12:
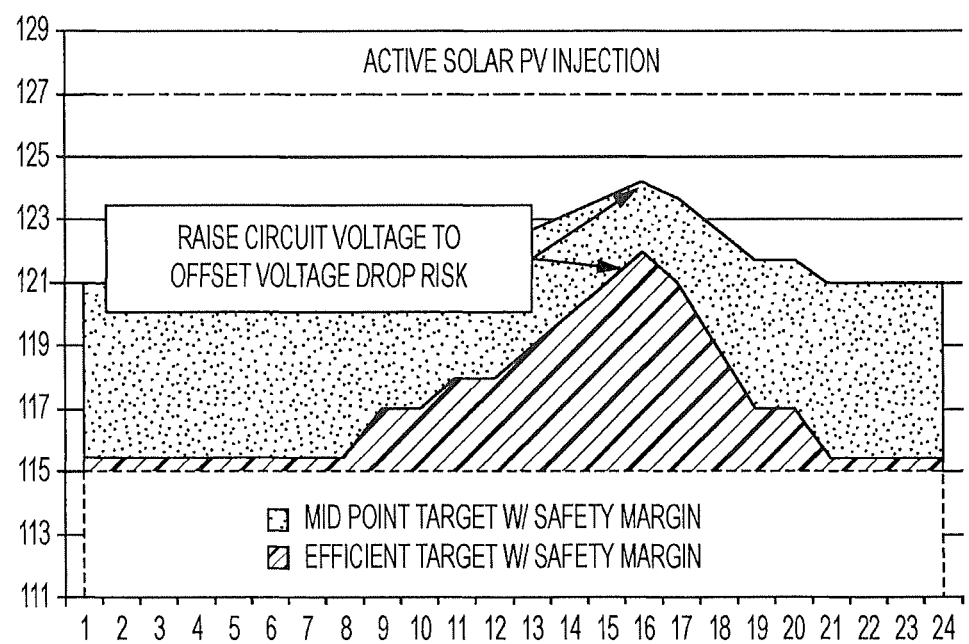
FIG. 12 shows a diagram depicting active solar PV injection and control, according to principles of the disclosure.

With reference to FIG. 12, when solar PV injection is high, grid voltage is subject to a sudden drop if the PV ceases production due to clouds or other disturbances. The VCC stabilizer function will hedge against this risk by operating the circuit at a safe, albeit higher, voltage target.

Figure 13:
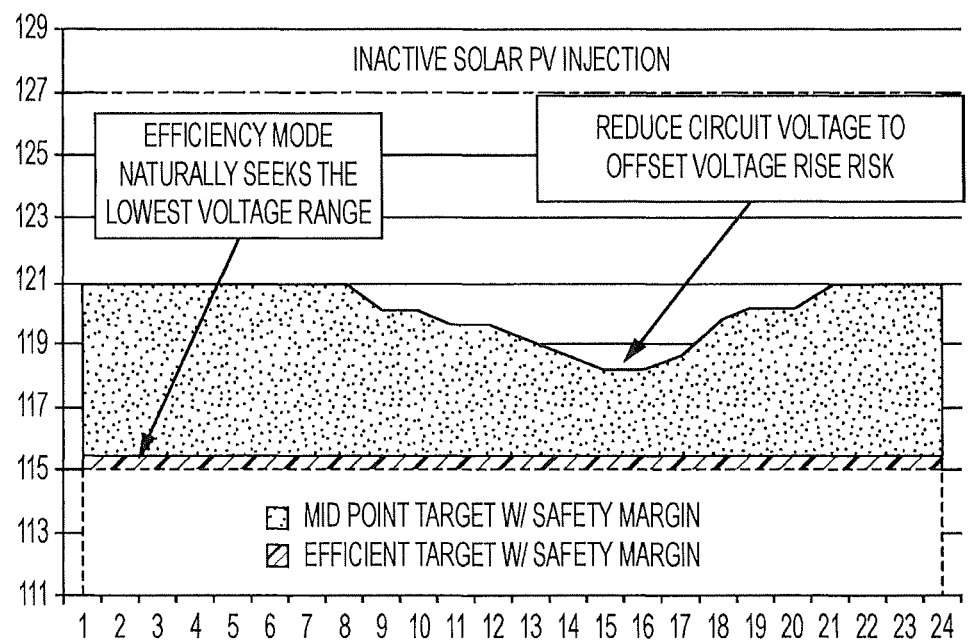
FIG. 13 shows a diagram depicting inactive solar PV injection and control, according to principles of the disclosure.

Similarly, Stabilizer will hedge against voltage rise risk when the circuit is at risk of a sudden surge in PV output. See, for example, FIG. 13.

Figure 14:
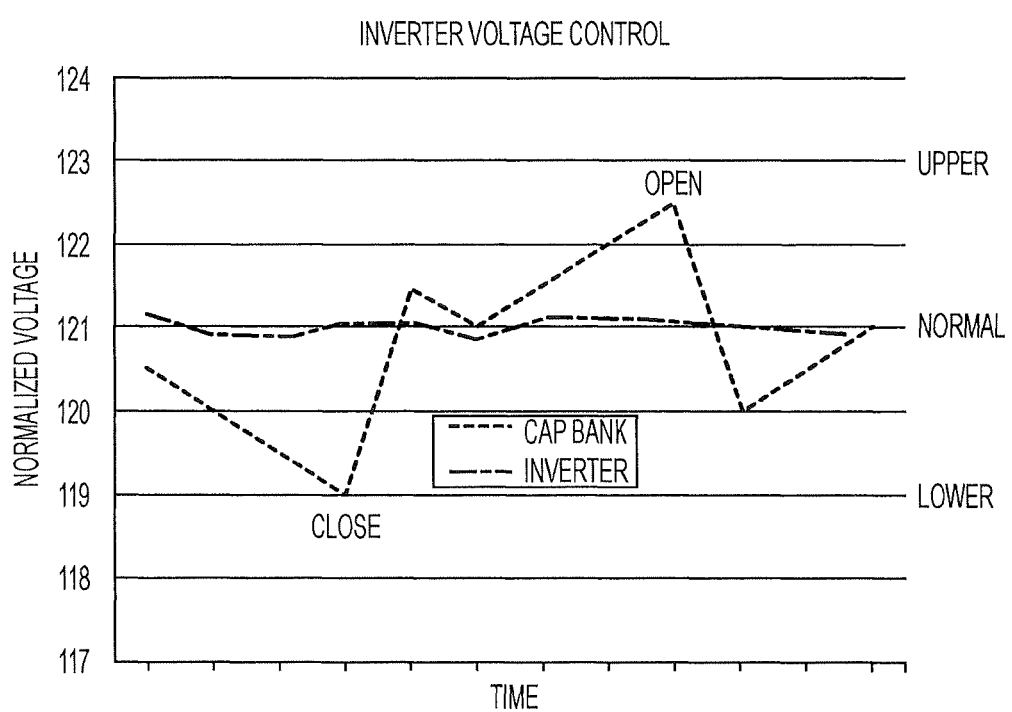
FIG. 14 shows a diagram depicting normalized voltage control using capacitor bank control and inverter control, according to principles of the disclosure.

In one example embodiment, consider a 2.25MVA inverter capable of up to 2MW or 2MVAR peak steady state operation. At peak MW output, the unit is still capable, in one example, of producing or absorbing 1MVAR of reactive power. One example feature of inverter VAR control is the continuously variable, bi-directional VAR support capability. The continuous nature of the VAR output allows much finer voltage control, then for example a capacitor bank, as illustrated in FIG. 14. Thus, as discussed above with respect to opening and closing capacitor banks, so too may inverters be configured to optimize the energy delivery system.

The inverter can provide a pseudo primary voltage regulator for voltage stability and VVO. The VCC, in one example, will optimize energy consumption through managing the VAR capabilities of the inverter.

In one example (Case #1), a Battery is OFFLINE (0MW mode)—a continuous VAR control is available from −2MVAR to +2MVAR. The primary voltage swing per MVAR will be configured in the VCC based upon the primary source impedance to the battery location. The VCC will evaluate the desired voltage profile based upon VVO voltage slope requirements and issue a reference voltage or MVAR production level for the inverter.

In another example (Case #2), a Battery is CHARGING—the inverter can produce up to 1MVAR to offset the voltage drop associated with the 2MW charging load. VCC will perform similar operations as in case 1; however, it is possible the 1MVAR production may only offset the voltage drop associated with the charging operation. It should be noted that if the local voltage is high, Manager may seek to zero out the MVAR to allow the charging to lower the local area voltage for efficiency sake.

In another example (Case #3), a Battery is DISCHARGING—the inverter can absorb up to 1MVAR to offset the voltage rise associated with the 2MW power injection. VCC will perform similar operations as in case 1; however, it is possible the 1MVAR consumption may only offset the voltage rise associated with the discharging operation. It should be noted that if the local voltage is low, VCC may seek to zero out the MVAR to allow the discharging to raise the local area voltage to levelize the circuit voltage profile for efficiency sake.

For any of the three scenarios above, VCC will sense the voltage from surrounding AMI meters in the block that is associated with this device and initiate the appropriate VAR production or absorption.

Small-scale residential or commercial inverters may also be used. Secondary voltage stability control can be achieved through low-voltage regulation devices and/or control of small-scale smart inverters. These small-scale voltage control devices call be configure for infrequent communications to update target settings or schedules based on anticipated grid conditions. Infrequent communications in one example can be about once a day.

One example is to sense local voltage volatility and adjust "fixed" power factor settings on a proactive schedule. For example, early afternoon power factors may be set to absorb VARs at a 95% rate to counteract high voltage, whereas late afternoon may seek unity power factor to lessen system VAR burden.

In another example, VCC may be configured to target a steady-state voltage at the inverter location and have the smart inverter automatically compensate VAR absorption/output to maintain the desired voltage. This approach is ideal for VVO optimization but would require a real power priority setting to assure VAR control does not reduce power production.

Other forms of distributed generation equipment could be controlled in similar ways to optimize energy delivery. Example embodiments of methods, systems, and components thereof have been described herein. As noted elsewhere, these example embodiments have been described for illustrative purposes only, and are not limiting. Furthermore, certain processes are described, including the description of several steps. It should be understood that the steps need not be performed in the described order unless explicitly identified as such, and some steps described herein may not be performed at all. The breadth and scope of the present invention should not be limited by any of the above described exemplary embodiments, but should be defined only in accordance with the following claims and their equivalents.

What is claimed as new and desired to be protected by Letters Patent of the United States is:

1. A control system for an electric power grid configured to supply electric power from a supply point to a plurality of user locations, the system comprising:

a plurality of sensors, wherein each sensor is located at a respective one of a plurality of distribution locations on the grid at or between the supply point and at least one of the plurality of user locations, wherein each sensor is configured to sense a component of the supplied electric power at the respective distribution location and to generate measurement data based on the sensed component of the power, and wherein at least a portion of the plurality of sensors are associated with a plurality of inverters, respectively, wherein the plurality of inverters are, respectively, located within a plurality of non-overlapping blocks of the grid and are adapted to generate and/or absorb reactive power;

a controller communicatively connected to the plurality of inverters and the controller is configured to minimize a plurality of block voltage slopes associated, respectively, with the plurality of blocks, to modify a controller target value of the supplied electric power based on an amount of distributed power generation, to generate an energy delivery parameter based on the controller target value of the supplied electric power, and to control the plurality of inverters to modify a voltage on the respective blocks, wherein the controller target value is a target voltage and the target voltage is raised as an amount of distributed power generation generated by the plurality of inverters increases; and a component adjusting device configured to adjust a component of the electric power grid at the supply point in response to the energy delivery parameter.

2. The system of claim 1, wherein the component of the supplied electric power is voltage and the controller target value of the supplied electric power is a controller target voltage band having a voltage set point and a voltage deviation range.

3. The system of claim 1, wherein the controller target value is a target voltage and the target voltage is lowered as the amount of distributed power generation decreases.

4. The system of claim 1, wherein the controller is further configured to add the measurement data from the plurality of sensors to a load profile, to assess the state of the grid, and to generate the energy delivery parameter to hedge against predictable voltage risk.

5. The system of claim 1, wherein the plurality of inverters are configured to modify volts-amperes reactive (VAR) absorption or production in response to the controller.

6. The system of claim 5, wherein the control system is configured to modify VAR absorption or production by the plurality of inverters to maintain a desired voltage at the respective inverters.

7. The system of claim 5, wherein the control system is configured to modify VAR absorption or production by the plurality of inverters to maintain a respective desired voltage within the respective blocks.

8. The system of claim 7, wherein the respective desired voltages minimize the plurality of block voltage slopes, respectively.

9. The system of claim 7, wherein the desired voltages are, respectively, adjusted based on a proactive schedule.

10. The system of claim 1, wherein the component adjusting device is configured to vary at least one of a voltage, a phase angle, a current angle, a power factor, a VAR and a power vector.

11. The system of claim 1, wherein the controller is configured to modify the controller target value of the supplied electric power, and/or the voltage on the respective blocks, based on the distributed energy resource injection and a pattern of voltage changes at the plurality of sensors.

12. The system of claim 1, wherein the controller target value of the supplied electric power has first upper and lower limits for a first control mode and has second upper and lower limits for a second control mode; and wherein the controller selects either the first or second modes based on the measurement data received from the sensors.

13. The system of claim 1, wherein the controller is further configured to control at least one of the plurality of inverters to offset a voltage drop associated with a load in the same block as the respective inverter by producing volts-ampere reactive (VARS).

14. The system of claim 1, wherein the controller is further configured to control at least one of the plurality of inverters to offset a voltage rise associated with another distributed energy resource injecting power into the same block as the respective inverter by absorbing volts-ampere reactive (VARS).

15. The system of claim 1, wherein the controller is further configured to control at least one of the plurality of inverters to meet the block voltage slope associated with its respective block by producing or absorbing volts-ampere reactive (VARS).

* * * * *